US006837435B2

(12) United States Patent
Kehoe et al.

(10) Patent No.: US 6,837,435 B2
(45) Date of Patent: Jan. 4, 2005

(54) ADAPTER UNIT HAVING A HANDLE GRIP FOR A PERSONAL DIGITAL ASSISTANT

(75) Inventors: Timothy Kehoe, Smithtown, NY (US); Christopher N. Crawford, Glen Cove, NY (US); Robert K. Destefano, Coram, NY (US); Robert J. Kowalski, Commack, NY (US); Dominick Salvato, North Salem, NY (US); Michael Sasloff, Hastings on Hudson, NY (US); Jorg Schlieffers, Setauket, NY (US); Gregory Jones, Seattle, WA (US)

(73) Assignee: Symbol Technologies, Inc., Holtsville, NY (US)

( * ) Notice: Subject to any disclaimer, the term of this patent is extended or adjusted under 35 U.S.C. 154(b) by 461 days.

(21) Appl. No.: 09/999,004

(22) Filed: Oct. 24, 2001

(65) Prior Publication Data

US 2002/0099894 A1 Jul. 25, 2002

Related U.S. Application Data

(63) Continuation-in-part of application No. 09/912,195, filed on Jul. 24, 2001, and a continuation-in-part of application No. 09/835,733, filed on Apr. 16, 2001, which is a continuation of application No. 09/528,239, filed on Mar. 17, 2000, now Pat. No. 6,244,513, which is a continuation of application No. 09/436,169, filed on Nov. 9, 1999, now Pat. No. 6,123,265, which is a continuation of application No. 08/883,357, filed on Jun. 26, 1997, now Pat. No. 5,979,770.
(60) Provisional application No. 60/263,438, filed on Jan. 23, 2001.

(51) Int. Cl.[7] .............................. H01G 9/16; G06K 7/10
(52) U.S. Cl. ........................... 235/472.01; 235/462.01; 361/625
(58) Field of Search .................. 710/100, 260, 710/305; 235/462.01–462.16

(56) References Cited

U.S. PATENT DOCUMENTS

| | | | | |
|---|---|---|---|---|
| 4,983,818 A | * | 1/1991 | Knowles | 235/462.47 |
| 5,218,187 A | | 6/1993 | Koenck et al. | 235/375 |
| 5,313,053 A | | 5/1994 | Koenck et al. | 235/472 |
| 5,335,170 A | * | 8/1994 | Petteruti et al. | 705/28 |
| 5,349,497 A | * | 9/1994 | Hanson et al. | 361/683 |
| D352,279 S | | 11/1994 | Foy et al. | D19/60 |
| 5,368,159 A | | 11/1994 | Doria | 206/320 |
| 5,388,692 A | | 2/1995 | Withrow et al. | 206/320 |
| 5,539,194 A | | 7/1996 | Miller et al. | 235/472 |
| 5,606,594 A | | 2/1997 | Register et al. | 379/58 |
| D379,265 S | | 5/1997 | Walthen et al. | D3/269 |
| 5,627,349 A | | 5/1997 | Shetye et al. | 178/18 |
| 5,648,757 A | | 7/1997 | Vernace et al. | 340/539 |
| 5,822,546 A | | 10/1998 | George | 395/281 |
| 5,859,628 A | | 1/1999 | Ross et al. | 345/173 |
| 5,914,481 A | | 6/1999 | Danielson et al. | 235/472 |
| 5,979,770 A | * | 11/1999 | Schlieffers et al. | 235/472.01 |
| 5,996,956 A | | 12/1999 | Shawver | 248/309.1 |
| 6,042,478 A | | 3/2000 | Ng | 463/44 |
| D424,035 S | | 5/2000 | Steiner et al. | D14/100 |
| D426,549 S | | 6/2000 | Carlson | D14/433 |
| 6,115,248 A | | 9/2000 | Canova et al. | 361/686 |
| 6,123,265 A | * | 9/2000 | Schlieffers et al. | 235/472.01 |
| 6,244,513 B1 | * | 6/2001 | Schlieffers et al. | 235/472.01 |
| 6,330,973 B1 | * | 12/2001 | Bridgelall et al. | 235/462.45 |
| 6,604,684 B1 | * | 8/2003 | Schmidt et al. | 235/462.32 |
| 6,619,546 B1 | * | 9/2003 | Nguyen et al. | 235/383 |

* cited by examiner

Primary Examiner—Tim Vo
(74) Attorney, Agent, or Firm—Amin & Turocy, LLP

(57) ABSTRACT

The present invention relates generally to an adapter unit for a personal digital assistant. More specifically, this invention relates to an adapter unit that has a handle grip. The adapter unit provides additional functionality, and improved ergonomics and increased ruggedness to the personal digital assistant.

19 Claims, 29 Drawing Sheets

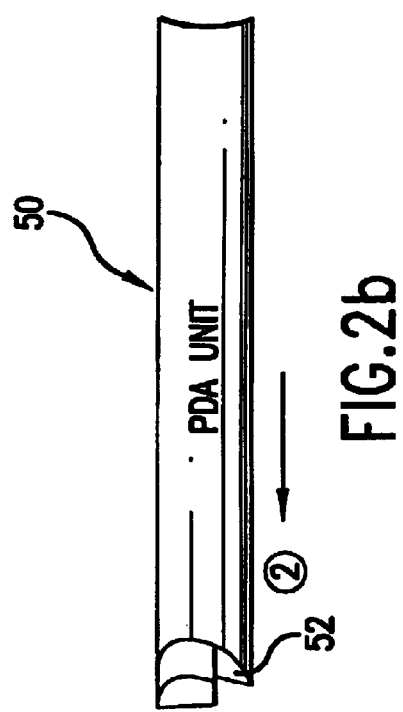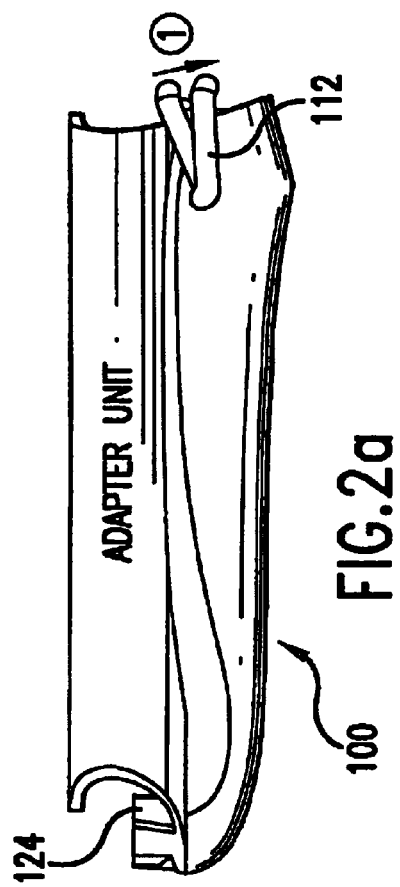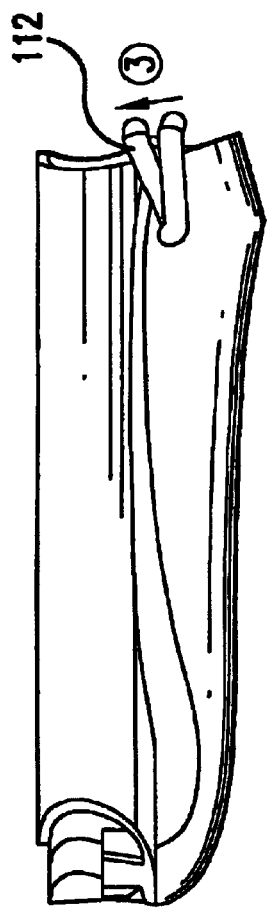

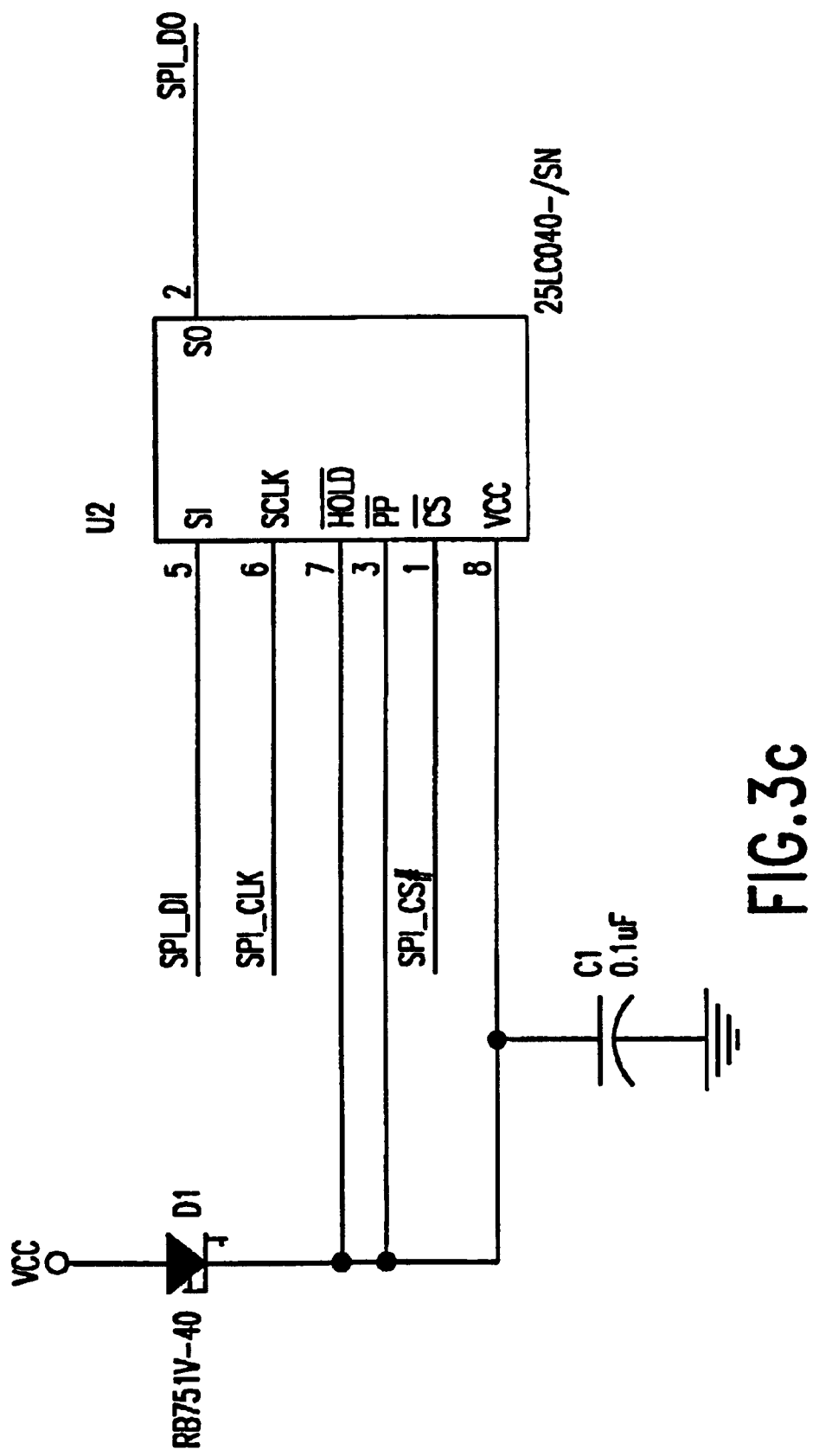

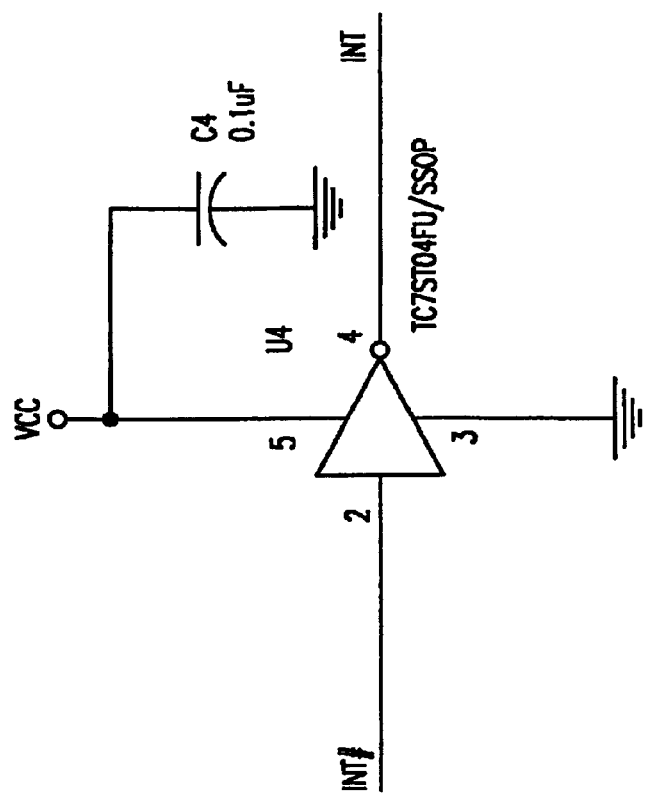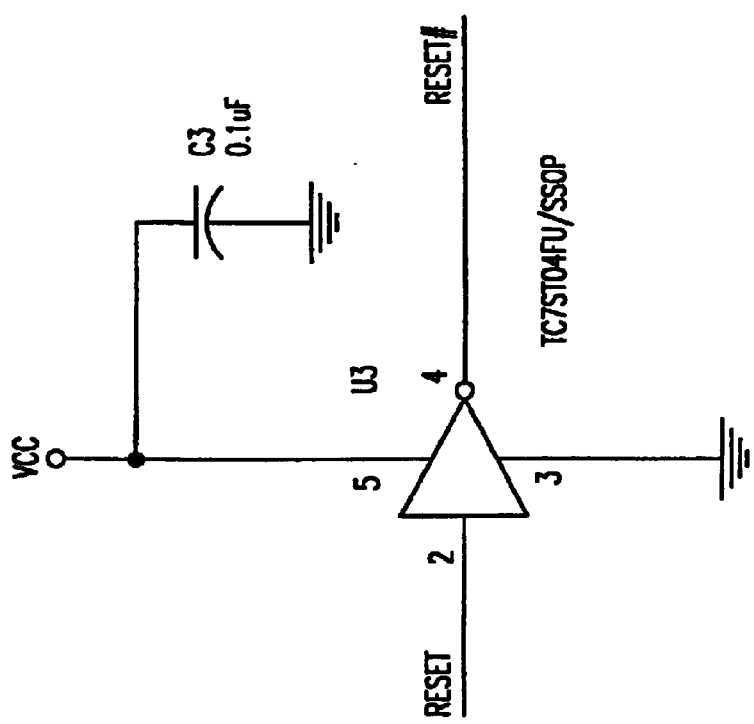
FIG.3d

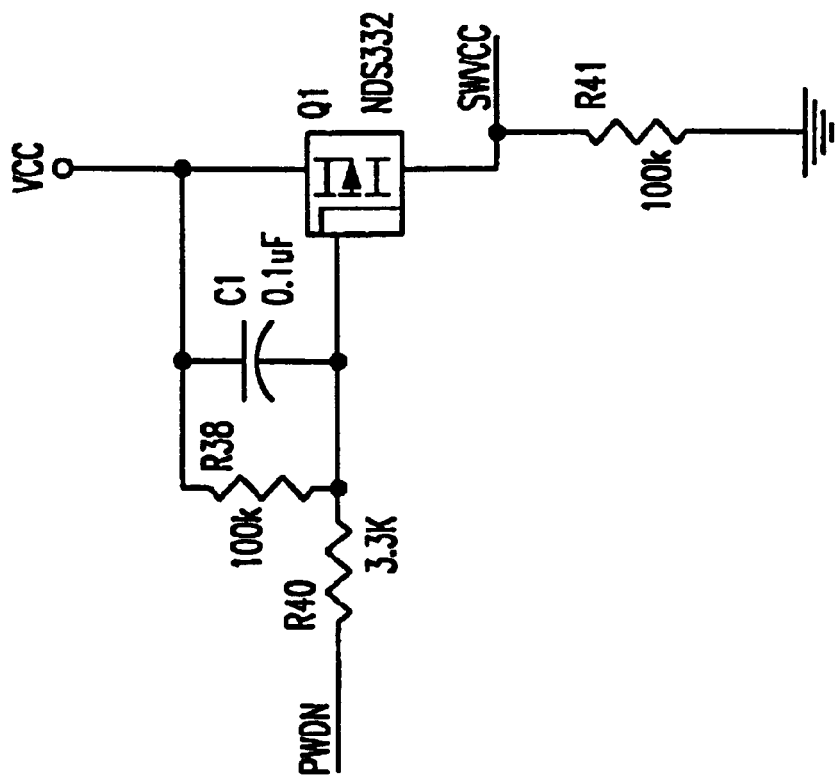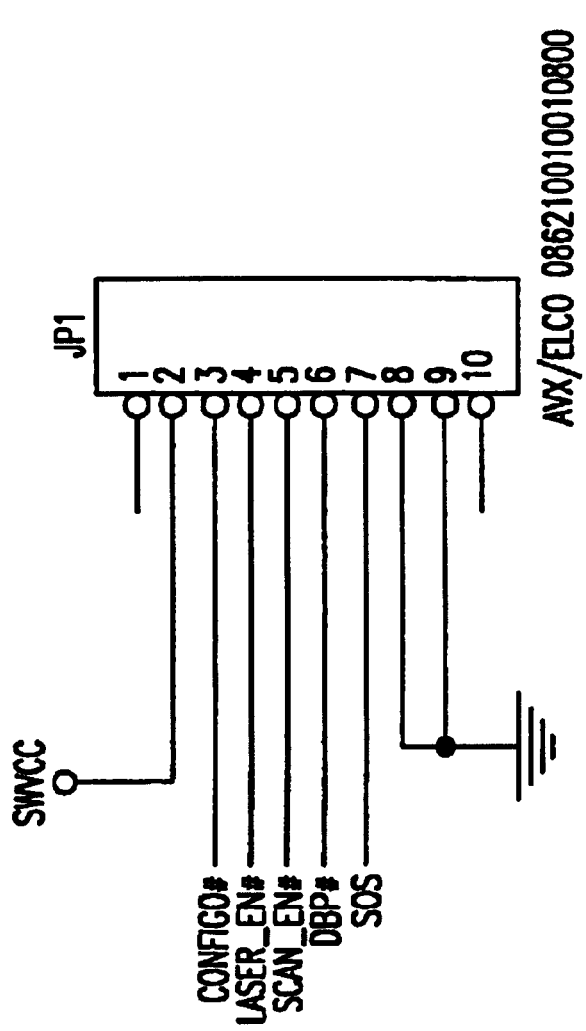
FIG.3f

ADAPTER UNIT HAVING A HANDLE GRIP FOR A PERSONAL DIGITAL ASSISTANT

RELATED APPLICATIONS

This application is a continuation in part application of pending U.S. patent application Ser. No. 09/912,195 filed Jul. 24, 2001 entitled Adapter Unit for a Personal Digital Assistant Having Automatically Configurable Application Buttons, which claims the benefits of the filing date of provisional application 60/263,438 filed Jan. 23, 2001, and a continuation in part application of pending U.S. patent application Ser. No. 09/835,733 filed Apr. 16, 2001 entitled Data Acquisition Apparatus, which is a continuation of U.S. patent application Ser. No. 09/528,239, filed Mar. 17, 2000 entitled "Data Acquisition Apparatus", and issued as U.S. Pat. No. 6,244,513, which is a continuation of U.S. patent application Ser. No. 09/436,169, filed Nov. 9, 1999, entitled "Data Acquisition Device Having a Resilient Seal Interposed Between the Head Portion and the Handle Portion for Rest Stand" and issued as U.S. Pat. No. 6,123,265, which is a continuation of U.S. patent application Ser. No. 08/883,357, filed Jun. 26, 1997 entitled "Data Acquisition Device Having a Resilient Seal Interposed Between the Head Portion and the Handle Portion for Rest Stand", and issued as U.S. Pat. No. 5,979,770.

FIELD OF USE

The present invention relates generally to an adapter unit for a personal digital assistant. More specifically, this invention relates to an adapter unit that provides additional functionality, and improved ergonomics and increased ruggedness to the personal digital assistant.

BACKGROUND OF THE INVENTION

Personal digital assistants ("PDA") or hand-held computers have limited functions. These devices typically include internal memory for storing application programs and a local database. PDAs also include external connector used during synchronization procedure ("hot-sync") with an external database located in a local or remote PC. The PDA is typically inserted into a "hot-sync" cradle, which is tethered to a desktop PC. The PC has a second database, which is similar to the local PDA database. During the "sync" operation both databases get updated with any information that was added to either one or the databases since the last synchronization procedure. While these devices can have various application programs running on them, they still have limited functionality. For example, a typical PDA may not have a detachable scanner or a detachable radio or a combination of both.

The iPAQ PDA manufactured by Compaq Computer Corporation has an expansion connector for interconnecting with different compatible modules, such as a scanning module. The expansion slot does not replace the "sync" connector, but is provided in addition to it. Thus, the iPAQ has to have two separate connectors to accommodate expanded functionality and "sync" operation. Once a scanning module is connected to the iPAQ, the expansion connector is occupied and no other module can be interconnected with the iPAQ. In addition, the combined device is not rugged enough to be used in industrial environment. Other then interconnecting to the PDA via an electrical connector, the module is not well secured to the PDA and upon drop or vibration the two elements may break or come apart, this rendering the system inoperative.

While the modules are able to provide additional functions to the personal digital assistant, such benefits come at a price. One of the advantages to the personal digital assistants is their portability. These units are designed to fit in a user's hand or palm. In many module designs, the depth and/or width of the combination personal digital assistant and module is considerably larger than originally designed by the personal digital assistant manufacturer. The combination of the two devices becomes difficult for a typical user to grasp.

As additional functions are added to the PDA, there is a greater need to change the functionality of the application buttons on the PDA. Presently, in order to change the function of an application button a user must input data on a series of screens on the PDA indicating the function the user would like to assign to the button. This process requires a certain amount of training on the use of the PDA, can be time consuming and is prone to human errors.

The PDA includes volatile memory such as RAM. Information stored in the volatile memory may be lost if the power level of the PDA's battery falls below a certain level.

Therefore, a need exists to provide a rugged detachable adapter having additional functionality for a hand-held computer such as a PDA.

A need exists to provide a rugged detachable adapter having scanning functionality for a hand-held computer, such as a PDA.

A need exists to provide a rugged detachable adapter having wireless communication functionality for a hand-held computer, such as a PDA.

A need exists to provide a detachable adapter having scanning and wireless communication functionality for a hand-held computer, such as a PDA.

A need exists to provide a rugged detachable adapter having scanning functionality and a user accessible PCMCIA slot for a hand-held computer, such as a PDA.

A need exists to provide an adapter having additional electronic functionality for a hand held computer such as a PDA.

A need exists to provide an adapter having additional electronic functionality for a hand held computer such as a PDA, wherein the combination PDA and adapter connects to a communications cradle in order to communicate with a PC.

A need exits to automatically change the functionality of one of the application buttons on the PDA in a manner that is seamless to the user.

A need exists to provide an adapter having additional nonvolatile memory that can store PDA applications and data when power is critically low.

SUMMARY OF THE INVENTION

The present invention provides an adapter unit that can be detachably secured to a hand-held computer, such as a portable digital assistant ("PDA") computer presently available on the market. Examples of such computers are the iPAQ manufactured by Compaq Computer Corporation, the Palm series manufactured by Palm, Inc. and the Visor series manufactured by Handspring Inc. The invention includes an adapter that adds functionality and ruggedness to a commercially designed device for use in a more industrial environment. The adapter has a PDA connector for interconnecting to the PDA's expansion connector. A scanner, battery and radio functions may be integrated in the adapter. Specifically, the adapter may include a card for wireless local area communication such as the Spectrum24® card manufactured by Symbol Technologies Inc., a card for wireless personal area network and/or a card for wireless wide area network communication. The adapter may include additional memory for storing data. This memory may include nonvolatile memory such as flash memory for storing drivers that support the functions added by the adapter. For example, the memory may store drivers for a scanner or a wireless local area network. In an alternative embodiment the adapter has a separated expansion connector for accommodating various functional modules. In certain cases, the adapter may also have its own sync connector, allowing it to be directly inserted into the PDA cradle.

In a preferred embodiment the invention includes an adapter unit that connects to PDA via the PDA's expansion connector. The adapter unit enhances mechanical ruggedness of the PDA and protects the PDA during drop and vibration. The adapter easily slides on the PDA and may incorporate a retainer clip to lock the adapter and the PDA together. Electronics in the adapter add bar code scanning, imaging capability, additional power, wireless and other PC card support.

In another preferred embodiment the invention includes an adapter unit having a gripping surface that enhances the ergonomics of the adapter and helps prevent the adapter from slipping out of a user's hand.

In another preferred embodiment the invention includes an adapter unit having a gripping surface that enhances the comfort to a user using a personal digital assistant.

In another preferred embodiment of the invention, the function of one or more of the application buttons on the PDA automatically changes upon the attachment of a device to the PDA.

In another preferred embodiment of the invention, when the PDA's battery is critically low, information stored in the PDA's volatile memory is automatically stored in a nonvolatile memory.

A strap can also be added on the back of the adapter for ergonomic and comfort reasons.

In an alternative embodiment a handle is added to the design, such that a handle supports the adapter, and the PDA/adapter combination is held as a gun-shaped terminal in the hand of a user. Batteries, both rechargeable and disposable, chargers and control systems can be added to the adapter.

BRIEF DESCRIPTION OF THE DRAWINGS

FIG. 2a is a side view of an embodiment of the adapter of the present invention illustrating release of the PDA retaining mechanism;

FIG. 2b is a PDA of the present invention;

FIG. 2c is an illustration of an embodiment of the adapter of the present invention connected to a PDA;

FIGS. 3A–3F) of an embodiment of the adapter of the present invention;

FIGS. 3A–3F illustrate the individual components of FIG. 3 comprising the electrical schematics of an embodiment of the adapter of the present invention incorporating a scanner therein;

DETAILED DESCRIPTION OF THE PREFERRED EMBODIMENTS

Figure 1E:
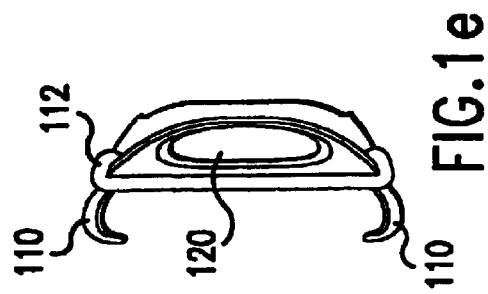
FIG. 1e is a front view of an embodiment of the adapter of the present invention.
Figure 1A:
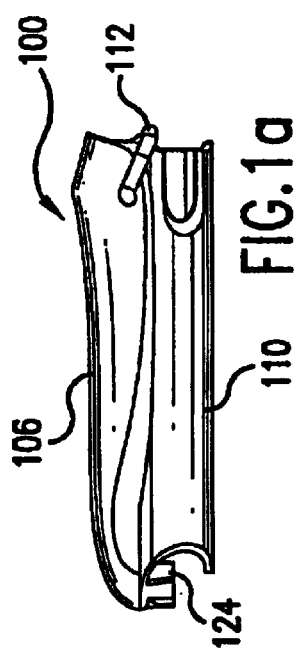
FIG. 1a is a side view of an embodiment of the adapter of the present invention.
Figure 1D:
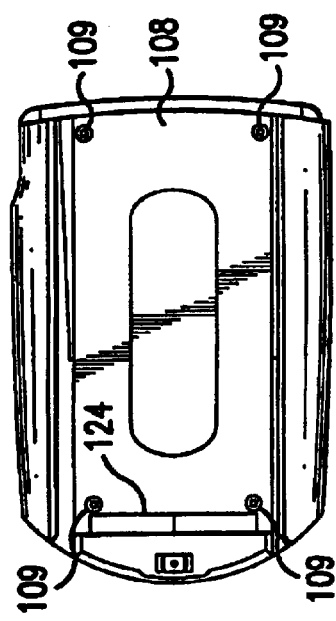
FIG. 1d is a bottom view of an embodiment of the adapter of the present invention.

FIG. 1a represents a side view of a preferred embodiment of the adapter 100 of the present invention. FIG. 1b shows the sled adapter from a top perspective view. FIG. 1g is a bottom perspective view of an embodiment of the adapter of the present invention. As shown in FIGS. 1a and 1b, the sled-type adapter includes a cover 104 and a carrier 106. The carrier 106 includes a bottom wall 108 and two sidewalls 110 extending from bottom wall 108. An interface circuit board and a scanner, a radio, RFID tag reader, global positioning system, telephone, and/or some other module, is housed between the cover 104 and the bottom wall 108 of the adapter. The adapter of FIG. 1a includes an integrated radio with a hidden antenna and an interface board that allows connection to the PDA. FIG. 1e is a front view of the adapter. FIG. 1e shows an adapter having an integrated scanner located behind the scanning window 120. Sidewalls 110 of carrier 106 are curved in such a way that they surround the PDA on both sides and protect the PDA from side-to-side movement and side impact. Sidewalls 110 prevent the adapter from being pulled off the PDA. FIG. 1c is a back view of the adapter of the present invention. It shows the edges of curved sidewalls 110 and the adapter connector 124 extending from the circuit board. A wall portion 106 of the adapter overlaps sidewalls 110, thus creating a seam overlap between the different portions of the adapter. The overlap helps the user to more easily hold the adapter/PDA combination device. FIG. 1d is a view of the adapter from the bottom, exposing the bottom wall 108 of the carrier from underneath. It shows four fasteners 109 that attach carrier 106 to cover 104, enclosing the electronics between carrier 106 and cover 104. Carrier 106 can be attached to the cover 104 and the electronics by snap-in features, screws or glue. It is preferable to make the adapter as thin and as small as possible in order to make it low profile and enhance its ergonomics. When, as in the presently illustrated case, the sidewalls are designed to protect the sides of the PDA, the height of the sidewalls is dictated by the height of the PDA to which the adapter attaches. In other designs the sidewalls may only partially cover the sides of the PDA.

At the extreme case, when no side protection of the PDA is needed, the sidewalls may be replaced by a pair of rails that mate with the corresponding guides on the PDA. However, when the sidewalls are eliminated, the overall ruggedness of the adapter/PDA-combined device is reduced.

Figure 1F:
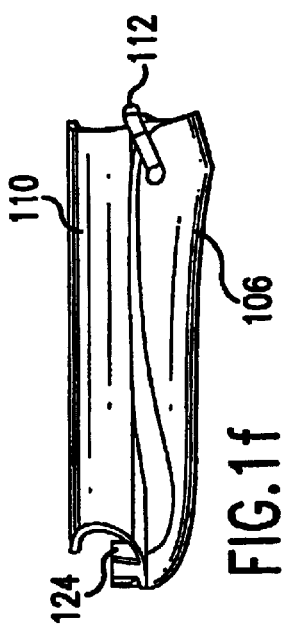
FIG. 1f is another side view of an embodiment of the adapter of the present invention.
Figure 1C:
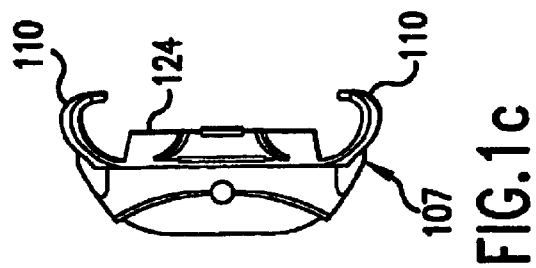
FIG. 1c is a back view of an embodiment of the adapter of the present invention.
Figure 1B:
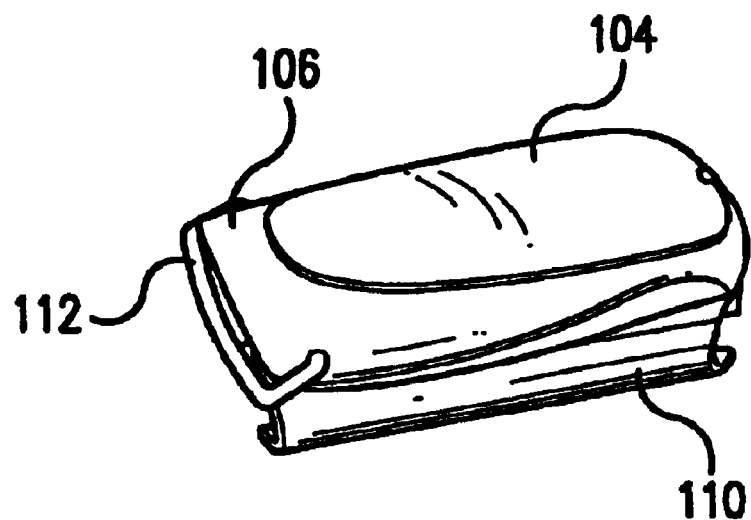
FIG. 1b is a top perspective view of an embodiment of the adapter of the present invention.
Figure 1G:
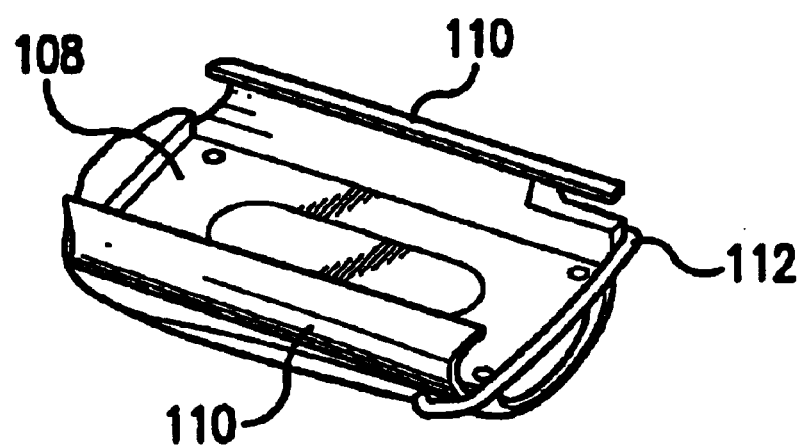
FIG. 1g is a bottom perspective view of an embodiment of the adapter of the present invention.
Figure 3:
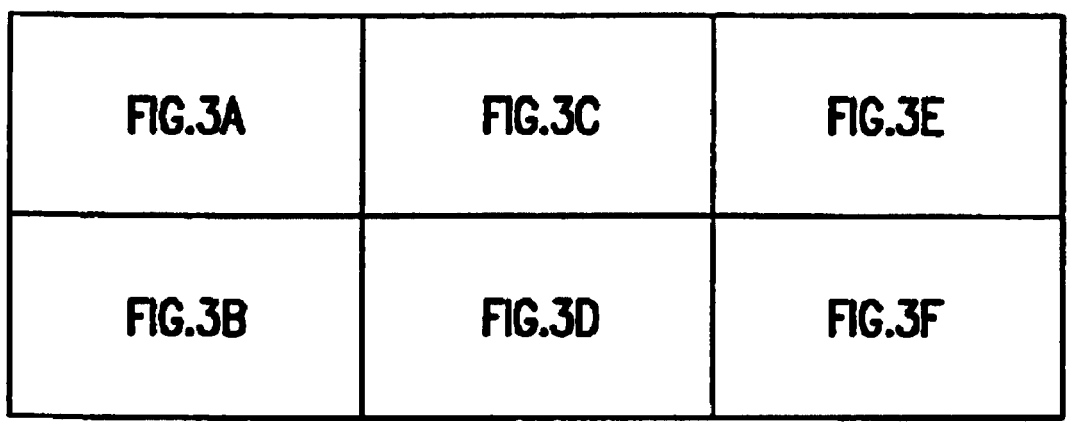
FIG. 3 is a general block diagram of individual components of an electrical schematic (e.g.
Figure 3A:
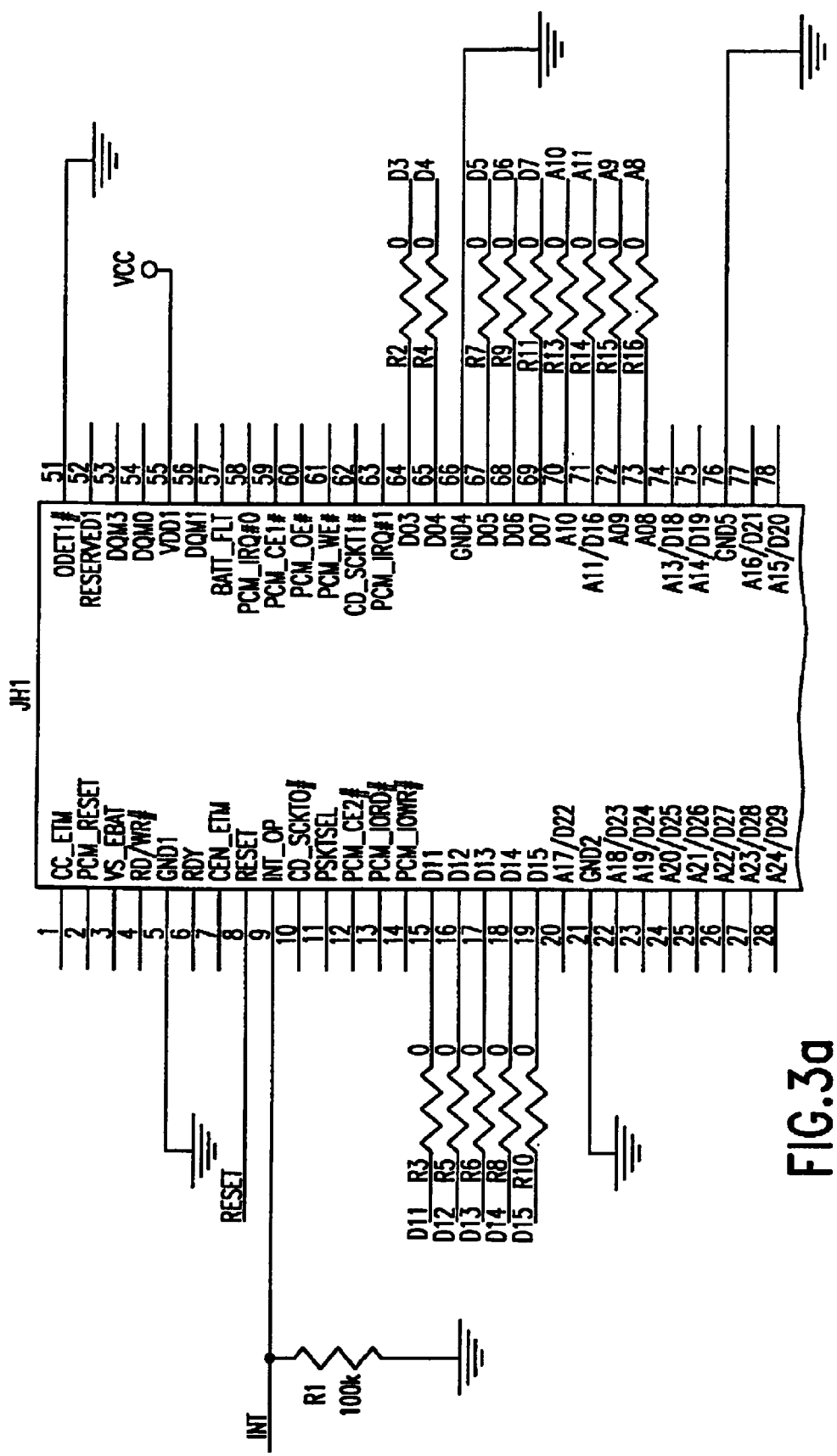
Figure 3B:
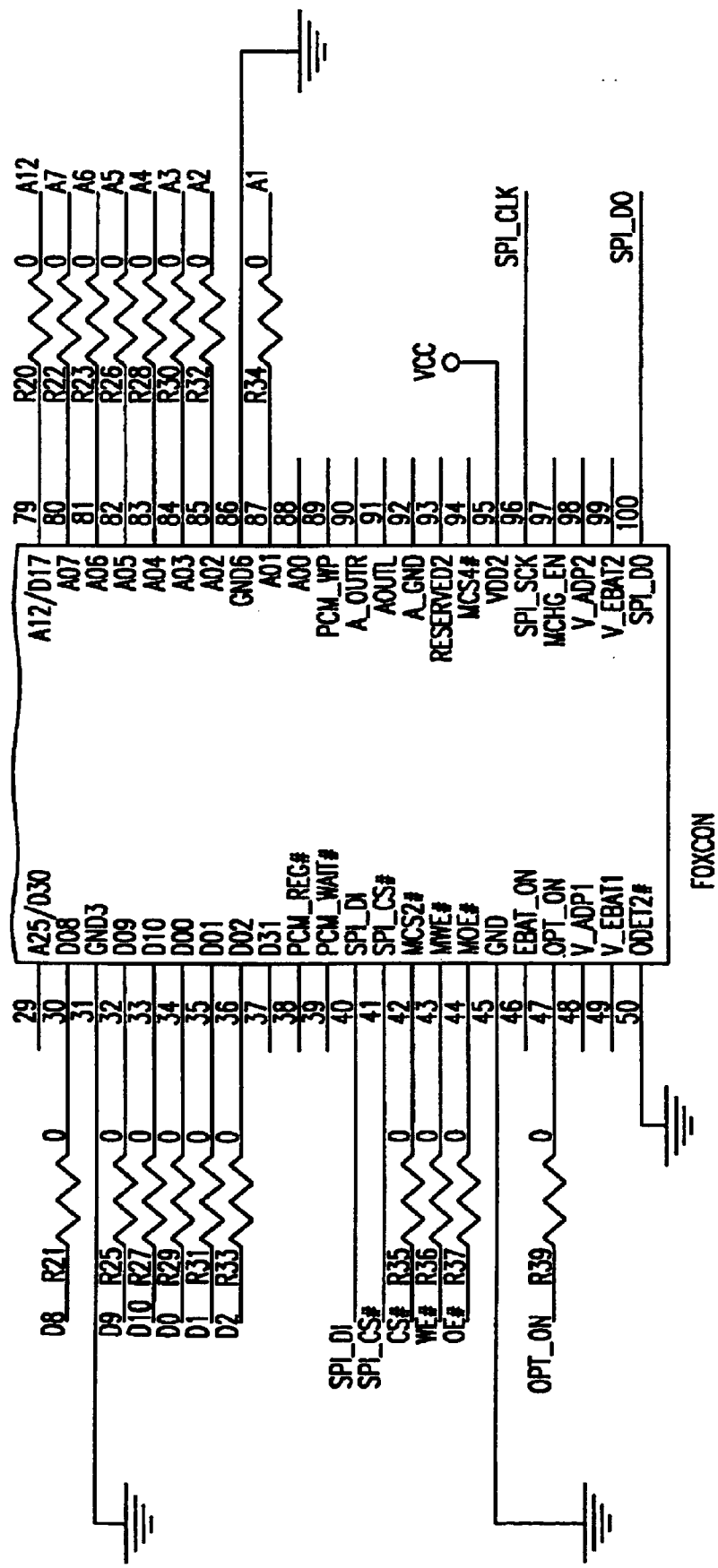
Figure 3E:
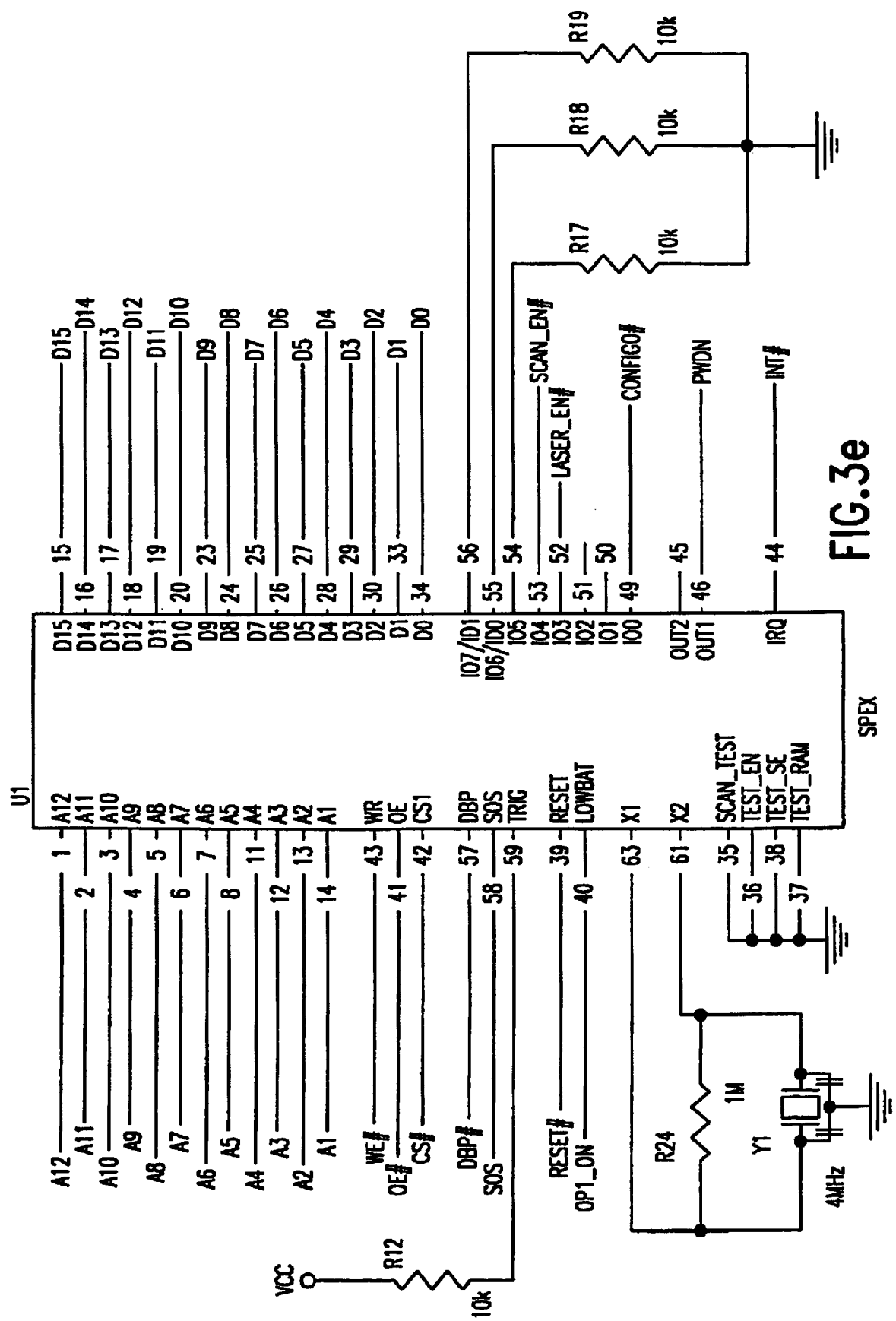

FIGS. 1f–g are additional views of the adapter when it is placed upside down.

When adapter 100 is connected to the PDA, sidewalls 110 restrict the side-to-side movements of the PDA with respect to adapter 100. Adapter connector 124 restricts movement of the PDA in one direction along the length of adapter 100. In order to restrict the movement of the PDA in the other direction along the length of adapter 100, and to fully secure adapter 100 to the PDA, a retainer clip 112 is provided as part of adapter 100. Retainer clip 112 is shown in FIGS. 1a, 1b, 1f and 1g. Retainer clip 112 secures the PDA to adapter 100 and prevents accidental disconnects between the two devices upon vibration or drop. In alternative embodiments the retainer can be replaced by snap fasteners, interference-fit, or detent features designed into the PDA and the adapter.

FIGS. 2a–c illustrate the method of attachment of a PDA 50 to adapter 100 of the present invention. PDA 50 includes an expansion connector 52. First, retainer clip 112 is pushed out of the path of PDA 50 that is being inserted into the adapter. Second, PDA 50 is fully inserted into adapter 100 and the PDA's expansion connector 52 is mated with the corresponding adapter connector 124. Third, retainer clip 112 is pushed back to its original position, fully securing PDA 50 within adapter 100 and preventing accidental separation of adapter 100 from PDA 50. Thus, when PDA 50 is inserted into adapter 100 of the preferred embodiment, adapter 100 protects PDA 50 on five of the PDA's six surfaces. The only PDA surface that remains exposed is the PDA's display surface.

FIGS. 3A–3F are electrical schematics of the interface board of the adapter of the present invention. The interface board includes circuitry for communicating with a bar code scanner via connector JP1. Alternatively, the interface board could include circuitry for an imager such as a charged coupled device (CCD) or similar technology known to those of skill in the art.

Figure 4A:
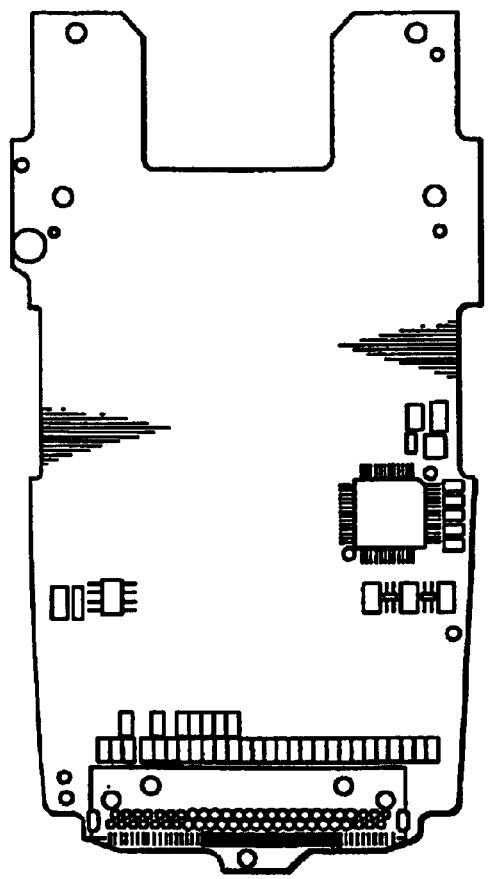
FIG. 4A is a drawing of a primary side view of a circuit board of an embodiment of the adapter of the present invention.
Figure 4B:
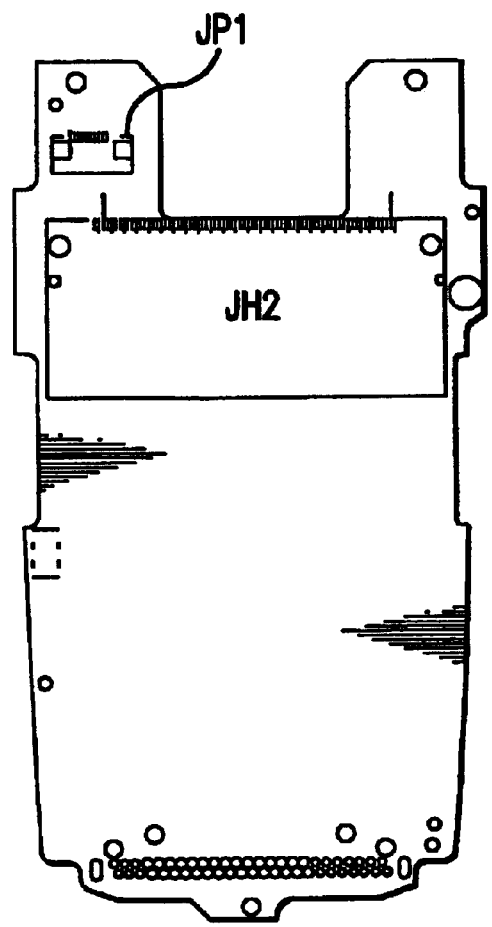
FIG. 4B is a drawing of a secondary side view of a circuit board of an embodiment of the adapter of the present invention.

FIGS. 4a and 4b show the primary and secondary sides, respectively, of a printed circuit board of the adapter according to the present invention. Connector JP1 interfaces electronics on the circuit board with a scanner module. An external connector JH1 interfaces electronics on the circuit board with the iPAQ PDA. A 68-pin connector JH2 interfaces electronics on the circuit board with a PC card having radio or other functionality. Thus, the adapter integrates both the scanner module and the radio module, together with an antenna, inside it. Some of the electronic components between the two modules can be shared.

In another alternative embodiment, the modules are not be integrated inside the adapter, but are selectively plugged into the adapter. For this, either the JP1 or JH2, must also be an external connector. For example, if the adapter has a PCMCIA compatible connector, any PCMCIA compatible module can be plugged into the adapter, thus expanding system flexibility even further. Module compatible interface connectors, other than the PCMCIA interface connectors are envisioned to be within the scope of the present invention.

As can be gathered from the above description, while the adapter must have a PDA compatible connector for interfacing to the PDA, the expansion module connector is optional.

FIGS. 8–13 are drawings of an alternative embodiment of the present invention. The adapter 200 includes a cover 204 and a carrier 206. The carrier 206 includes a bottom wall 208 and two sidewalls 210 extending from bottom wall 208. Curved portions 211 of sidewalls 210 of carrier 206 are curved in such a way that they partially cover the sides of the PDA. Curved portions 211 protect the PDA from side-to-side movement and side impact. Curved portions 211 also prevent adapter 200 from being pulled off the PDA and protect the PDA from front impact. An interface circuit 227 board and a scanner, a radio, RFID tag reader, global positioning system, telephone, or some other module, is housed between the cover 204 and the bottom wall 208 of the adapter. The adapter of FIG. 8a shows an adapter having an integrated scanner located behind the scanning window 220.

Sidewalls 210 include a gripping surface 213 for improved ergonomics. As electronic components are added to the adapter, the overall thickness of adapter may increase. Users with small hands may have difficulty wrapping their fingers all the way around to the curved portion of the sidewalls. Gripping surface 213 provides a surface for these users to place their fingertips allowing them to grasp the adapter in a secure manner. Users with larger hands may choose to place their fingertips either on the side of the PDA or on gripping surface 213. When viewing the adapter from a horizontal position, the gripping surface 213 has a portion that is below bottom wall 208 and a portion that is above bottom wall 208.

Figure 13:
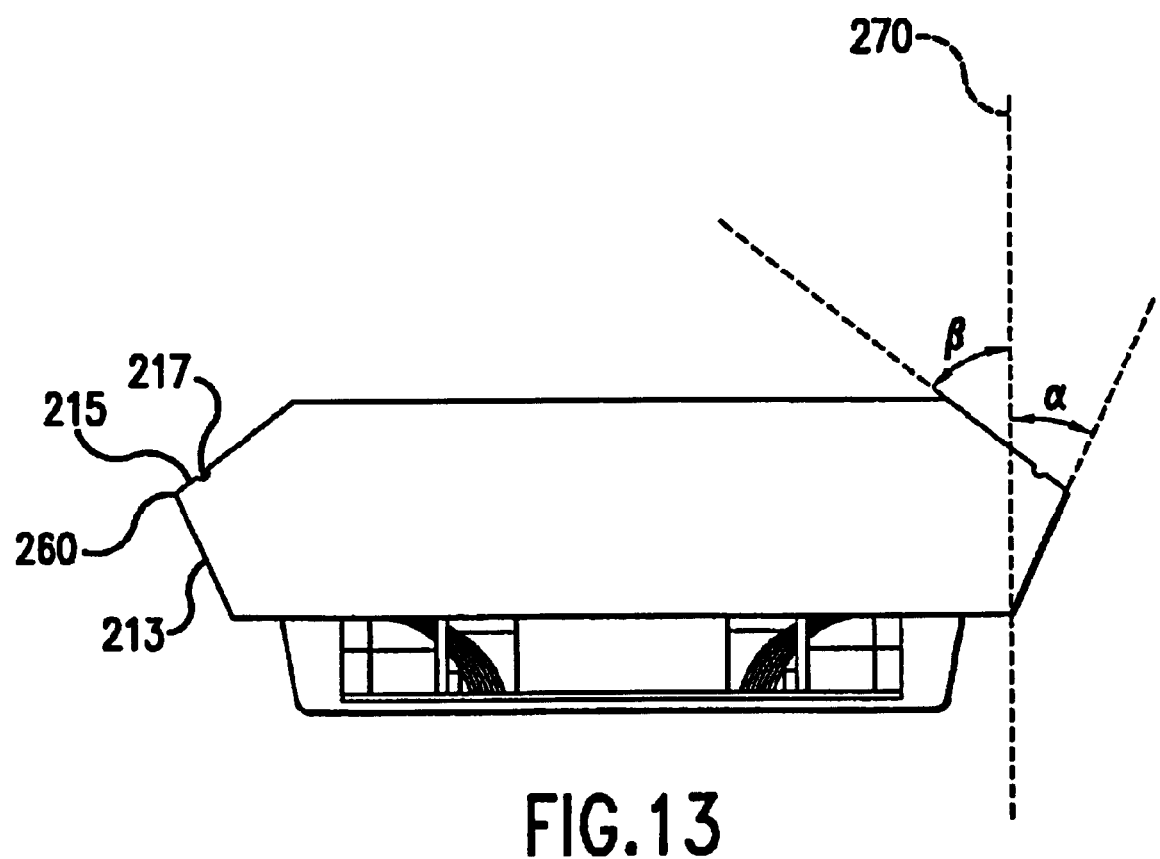
FIG. 13 is a view taken along line A—A of FIG. 12.

As illustrated in FIG. 13, gripping surface 213 has a portion that radiates in an outward direction relative to a vertical axis 270. An angle $\alpha$ is formed along vertical axis 270 and the gripping surface 213. Angle $\alpha$ may change depending on where along gripping surface 213 it is measure. An angle $\beta$ is formed along vertical axis 270 and a side section 215 above the gripping surface 213. Side section 215 consists of portions of carrier 206 and cover 204 (not shown in FIG. 13). FIG. 13 shows a seam 217 where carrier 206 meets cover 204. Alternatively, the side section could consist of portions of only the carrier or only the cover. Gripping surface 213 and side section 215 meet to form a ridge 260. Ridge 260 improves the ergonomics of adapter 200 and helps prevent a user's fingers from slipping off gripping surface 213.

Figure 10:
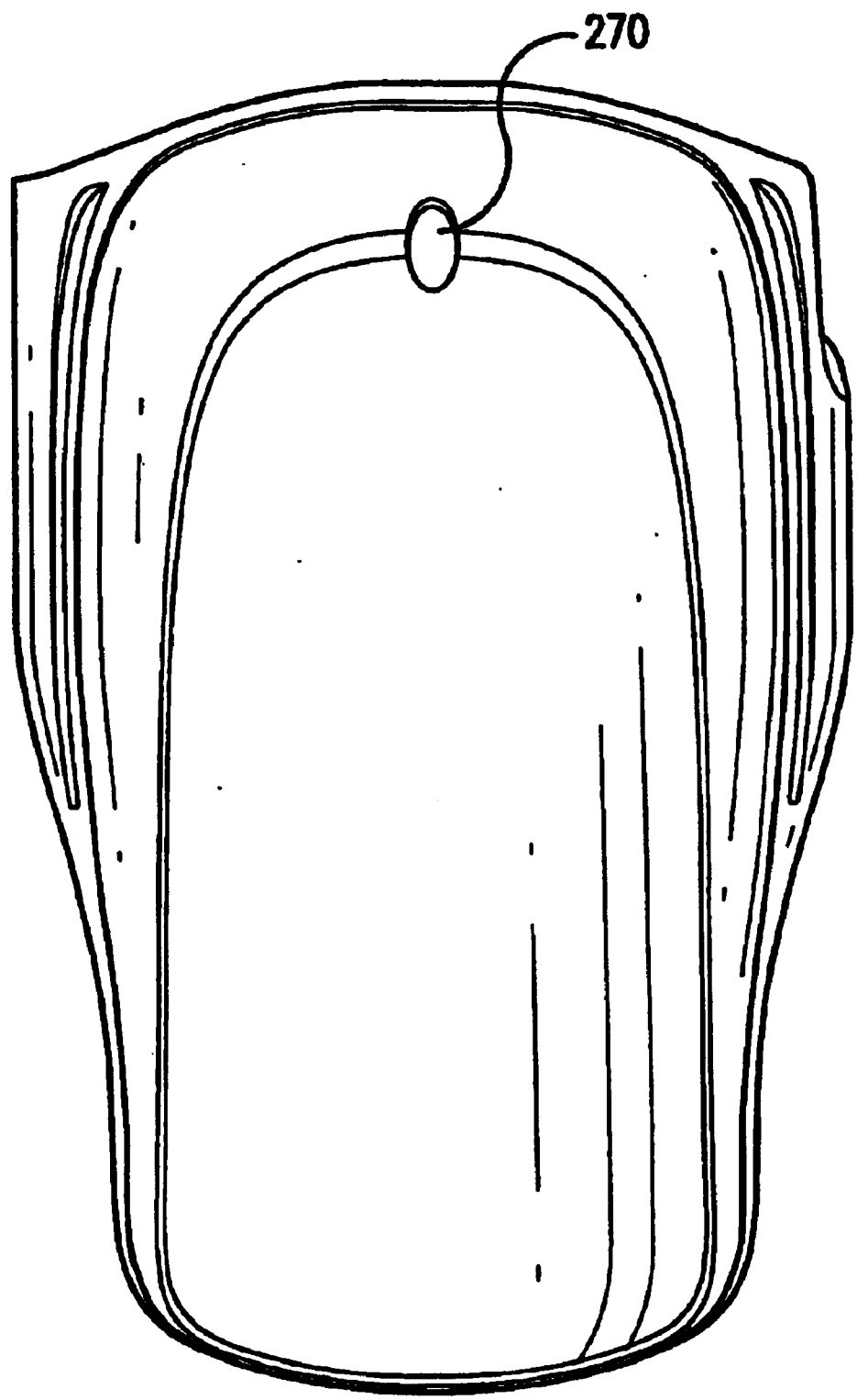
FIG. 10 shows a top view of the embodiment of the present invention shown in FIGS. 8a and 8b.
Figure 11:
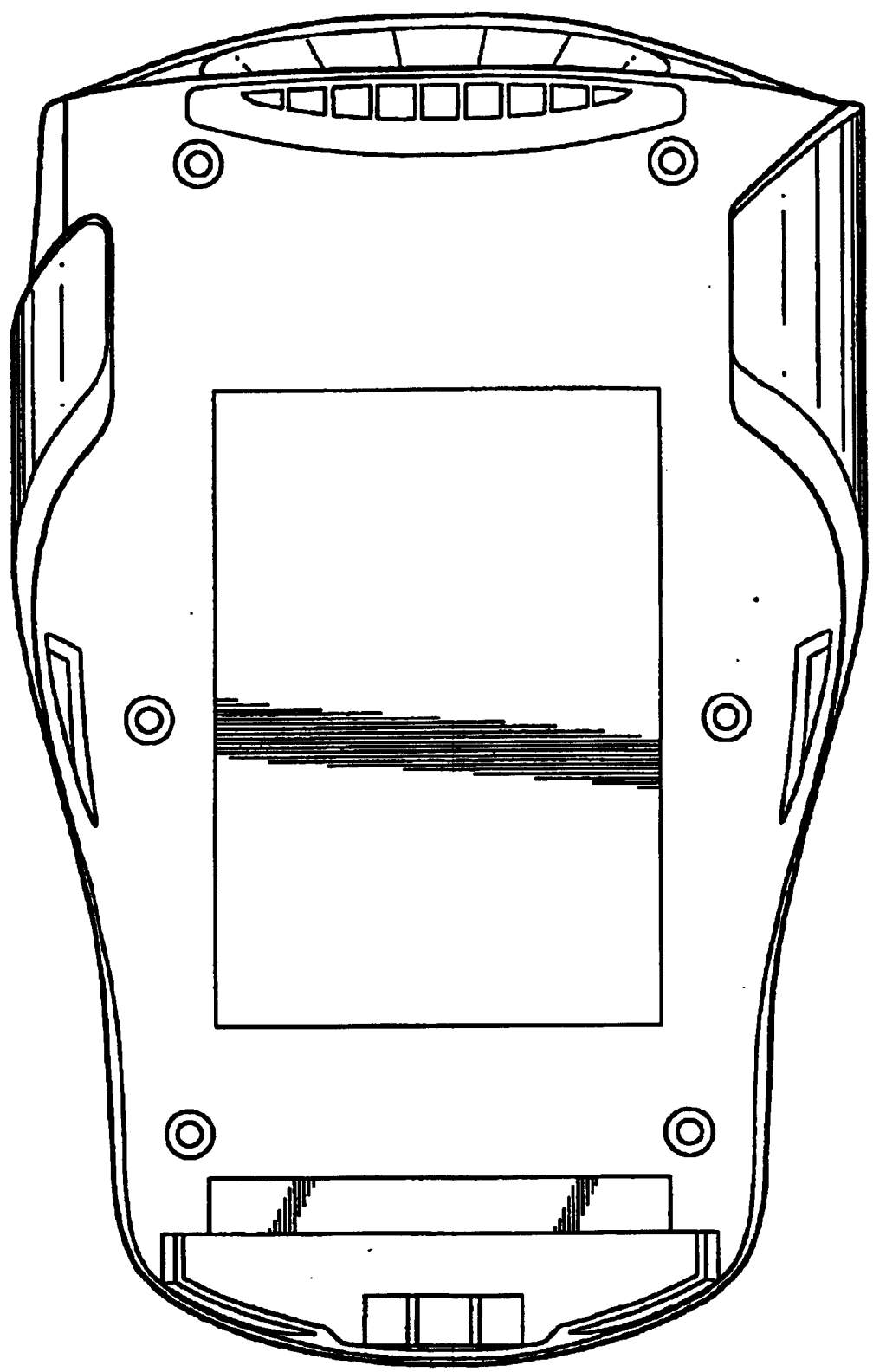
FIG. 11 shows a bottom view of the embodiment of the present invention shown in FIGS. 8a and 8b.
Figure 12:
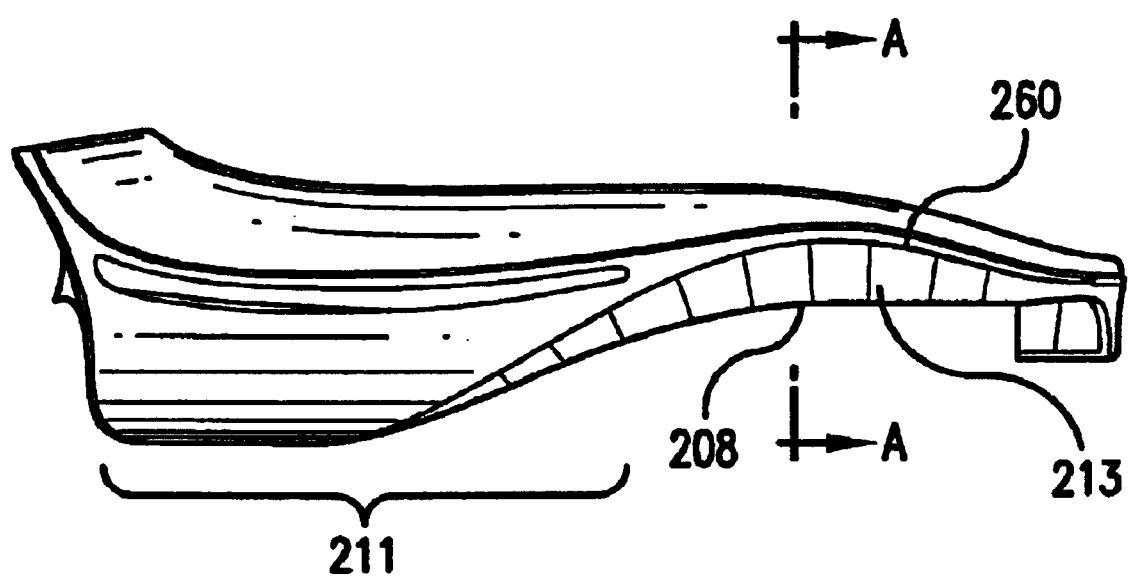
FIG. 12 shows a side view of the embodiment of the present invention shown in FIGS. 8a and 8b.

FIG. 10 shows a notch 270 where a tether or strap (not shown) can be attached to adapter 200. The tether allows the operator to carry the device without worrying about dropping it. Tether is preferably attached to the top of adapter 200 so if adapter 200 hangs from the tether the PDA would be in an upright position and less likely to slip out of the adapter.

Adapter 200 shown in the embodiment of FIGS. 8–13 does not have a retainer clip. In an alternative embodiment adapter 200 could include a retainer clip to lock the adapter and the PDA together as shown in the embodiments of FIGS. 1a, 1b, 1e, 1f and 1g. When adapter 200 is connected to the PDA, curved portions 211 restrict the side-to-side movements of the PDA with respect to adapter 200. Adapter connector 224 restricts movement of the PDA along the length of adapter 200.

A connector interface 205 is flexibly secured to adapter 200. Connector interface 205 may be secured by a spring or similar arrangement to allow it to move in an orthogonal direction relative to the bottom wall 208. The connector interface 205 has ribbed members 205a that engage with a receiving receptacle on the PDA (not shown). When the PDA is inserted into adapter 200, connector interface 205 is forced down until the PDA's receiving receptacle engages ribbed members 205a. At this moment ribbed members 205a springs up into the PDA's receiving receptacle creating an audible click. The audible click notifies the user that adapter 200 is fully secured to the PDA.

Figure 5:
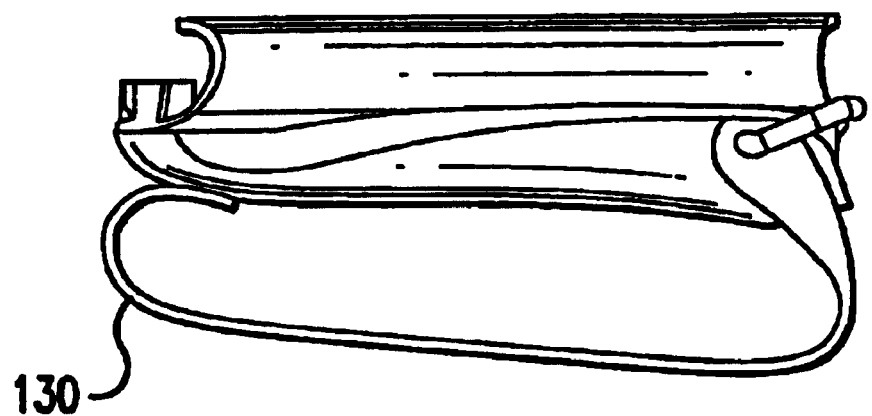
FIG. 5 illustrates an adapter and a hand strap according to the invention.

FIG. 5 illustrates an adapter having a hand strap 130. Hand strap 130 is attached to the top of the adapter and allows the operator to carry the device without worrying about dropping it. The adapter, which is typically made out of plastic material, can have a rubber over-mold with a finger grip designed into it.

Figure 6:
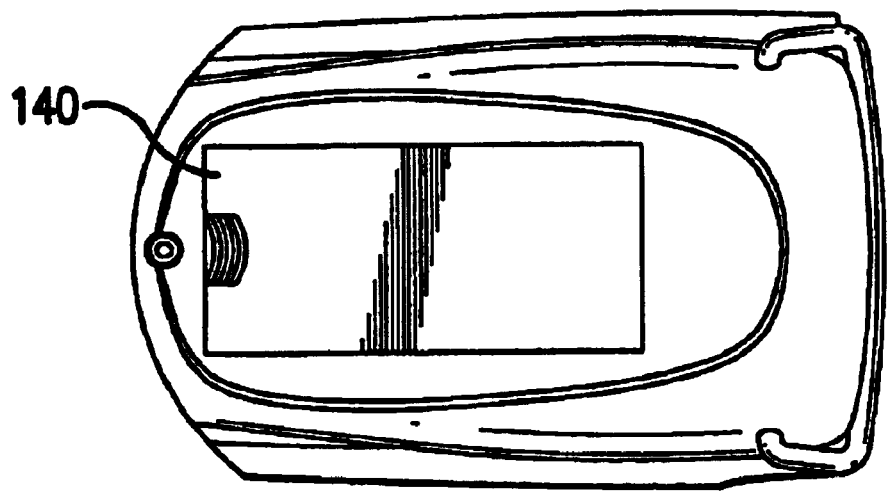
FIG. 6 shows compartment for a rechargeable battery located inside the adapter.

FIG. 6 shows compartment for a rechargeable, or a disposable, battery located inside the adapter. The battery is accessed via a battery door 140 that forms a part of the adapter's top cover. The adapter may also include a vibrating mechanism. The vibrating mechanism vibrates to the adapter to act as an alert the user. This feature is particularly useful in applications where there is a lot of background noise and an audio alter would not be heard.

Figure 7:
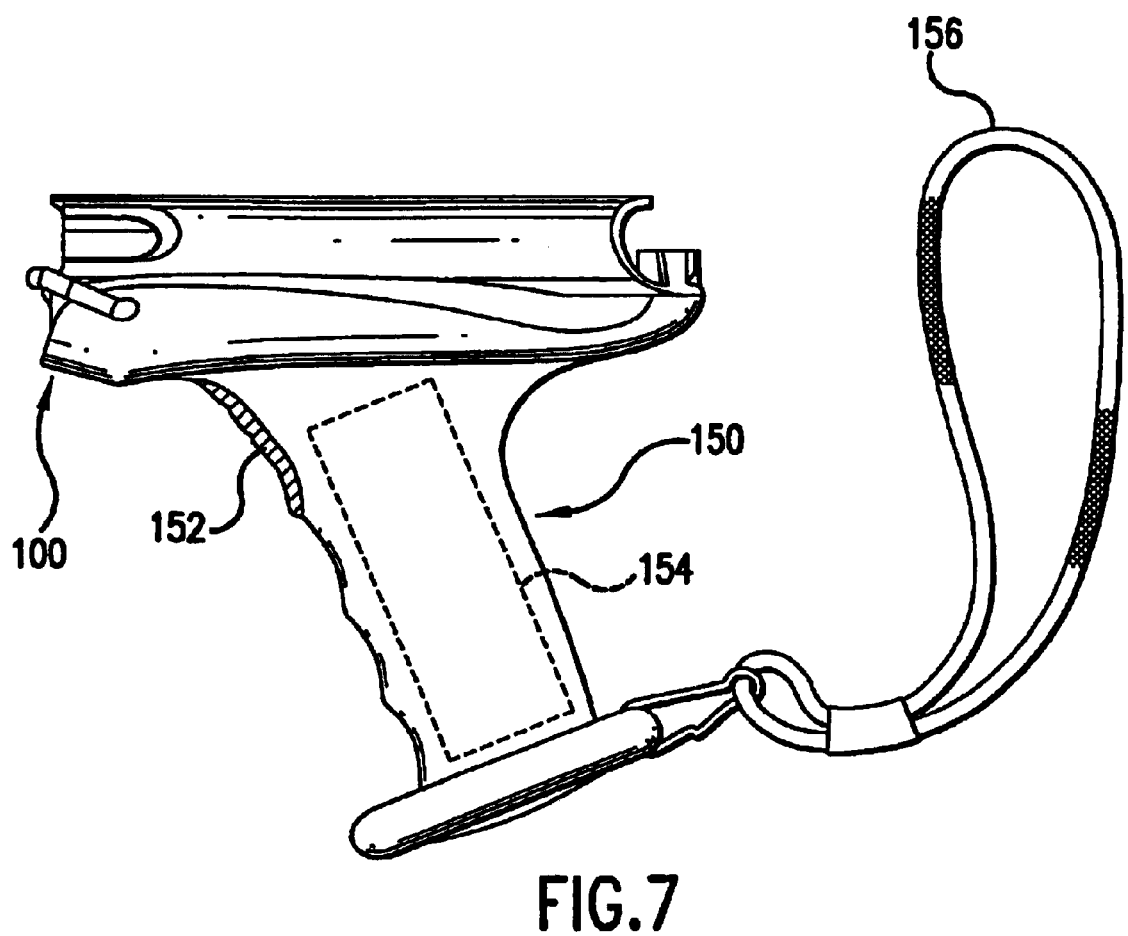
FIG. 7 shows an adapter with a handle grip.
Figure 8A:
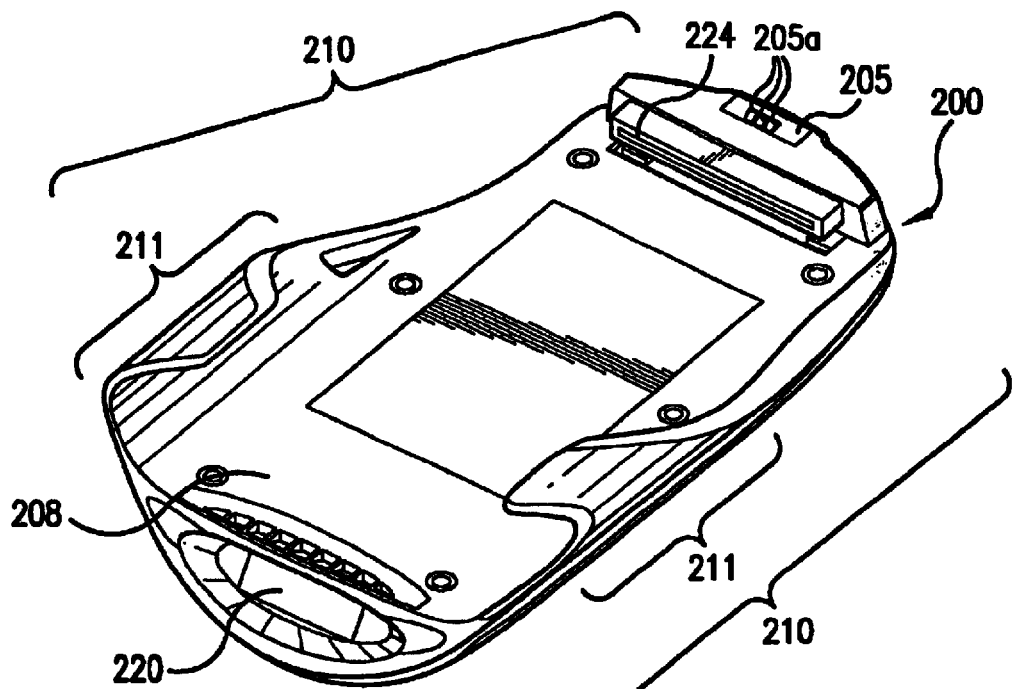
FIGS. 8a and 8b show a bottom perspective view of another embodiment of the present invention.
Figure 8B:
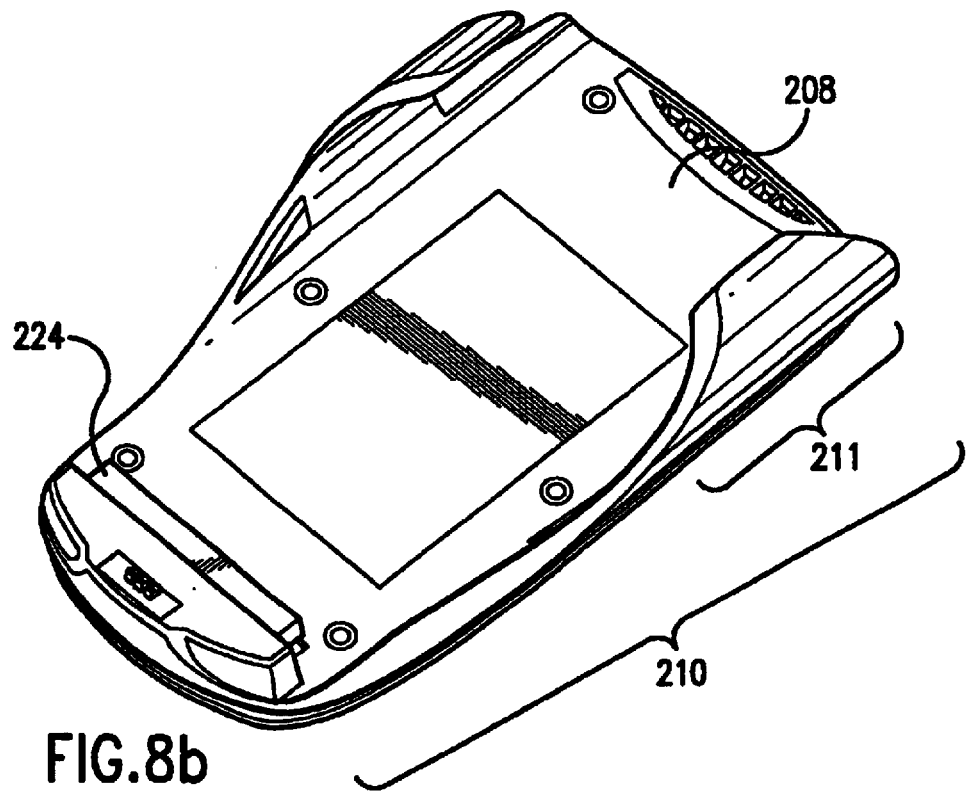
Figure 9:
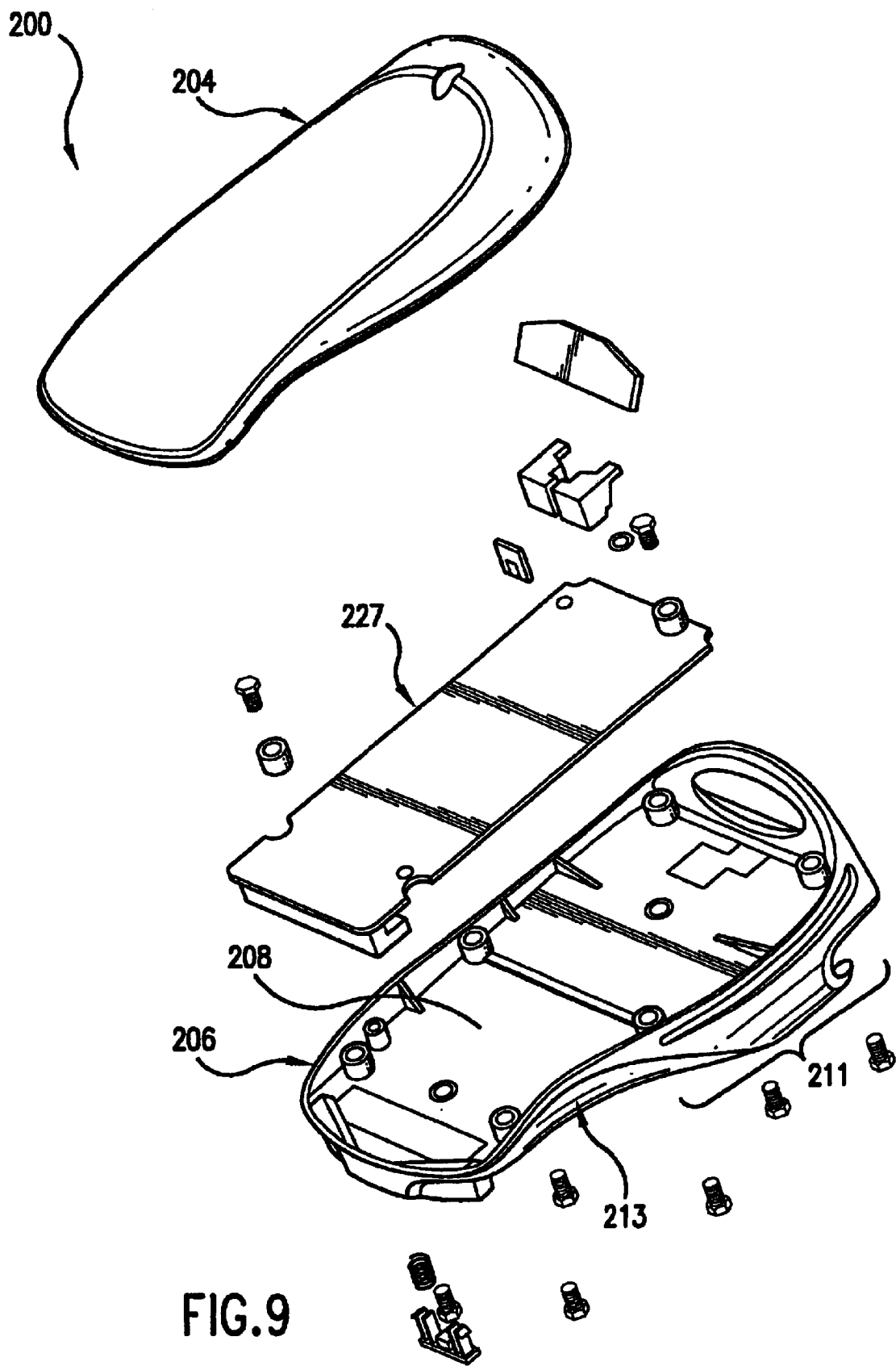
FIG. 9 shows an exploded perspective view of the embodiment of the present invention shown in FIGS. 8a and 8b.

FIG. 7 shows an adapter having a handle grip 150 extending from the surface of the adapter. Handle grip 150 may be detachable from the adapter. In addition, handle grip 150 includes a trigger mechanism 152 for triggering ("energizing") the module that is integrated inside the adapter. Handle grip 150 has a battery compartment 154 inside it, such that the device can be operated for longer periods of time. As an alternative, the adapter may not have any batteries inside, and would receive its power from handle grip 150. Handle grip 150 also includes a wrist tether 156 allowing the operator to carry the device without having to grip it.

Changing Functionality of Application Buttons

In one embodiment of the present invention a user can change the functionality of one or more of the application buttons on the PDA in a manner that is seamless to the user. For example, one of the buttons on the PDA may be dedicated to functioning as an audio recording button. When a user attaches an adapter that has scanning capability, the user may want to use that button to trigger a scanning operation instead of audio recording. According to a preferred embodiment, by attaching the adapter to the PDA, the functionality of the button may be reconfigured to a scanning function without any additional steps by the user.

Figure 14:
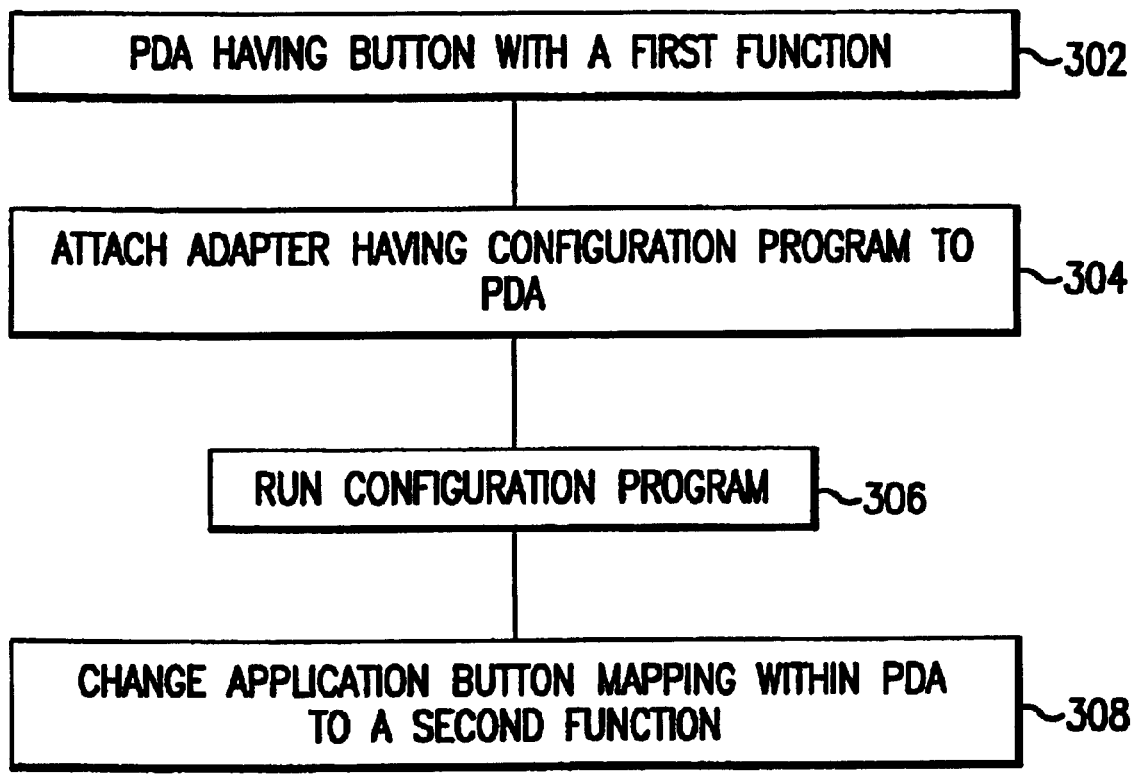
FIG. 14 shows a flowchart representing a configuration routine for a preferred embodiment of the present invention wherein an adapter is attached to the PDA.

FIG. 14 shows a flowchart representing a configuration routine for a preferred embodiment of the present invention. Step 302 represents a PDA having an application button that is assigned a certain function. In this preferred embodiment the adapter includes nonvolatile memory that includes a configuration program. The configuration program may include a program that includes routines for changing the functionality of one or more of the application buttons on the PDA. The configuration program changes application button mappings within the PDA to produce the desired functionality. When a device (such as an adapter) is attached to the PDA (and when the PDA is turned on) at 304, the PDA will run the configuration program at 306. At step 308, the configuration program will change the application button mapping in the PDA to change the functionality of one or more of the application buttons from an original function to a reconfigured function. Thus, the change of function of the buttons is seamless to the user. The reconfigured function of the button will preferably be related to a function that was added by the attachment of the adapter to the PDA.

Figure 15:
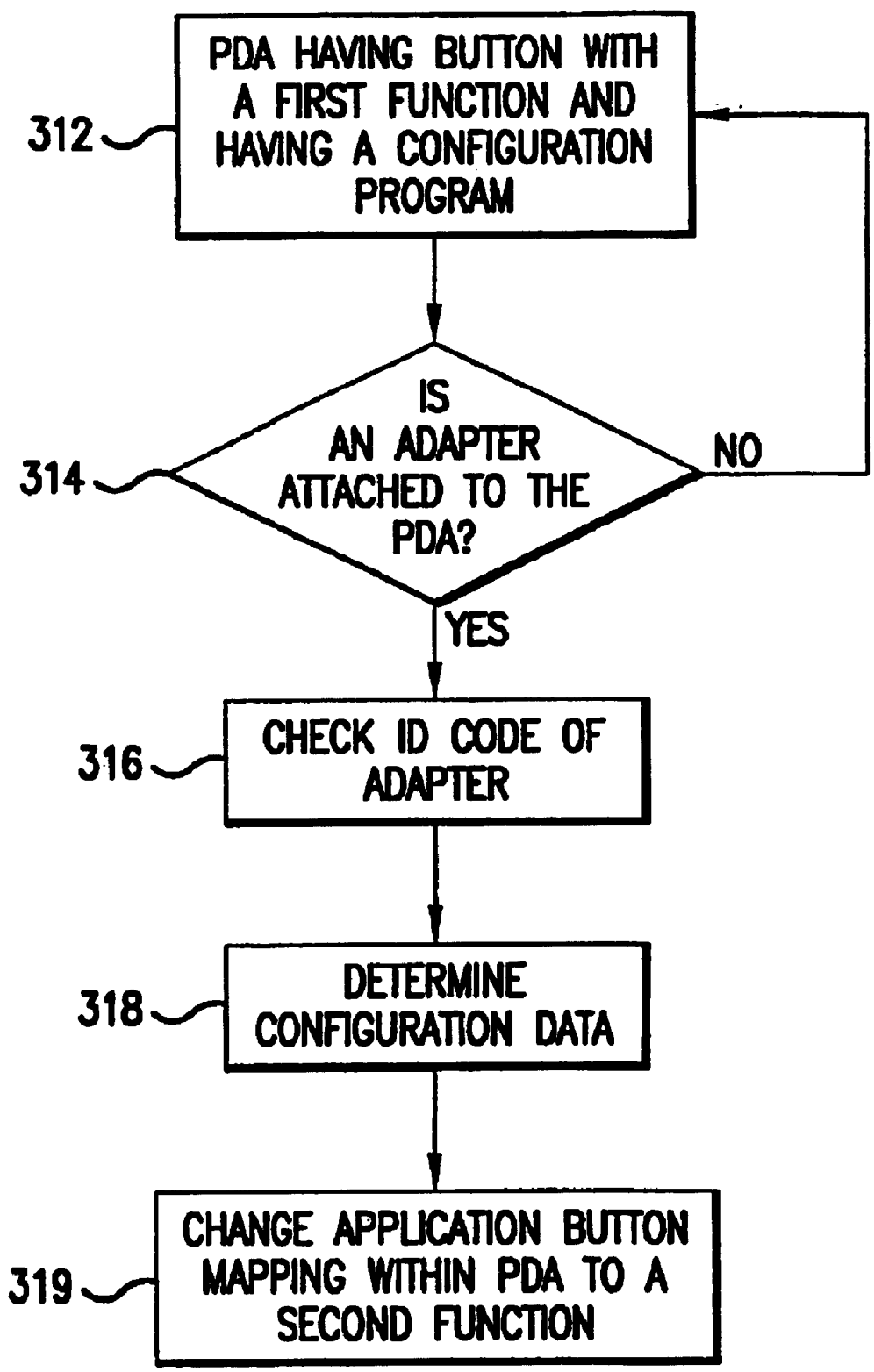
FIG. 15 shows a flowchart representing a configuration routine for another preferred embodiment of the present invention wherein an adapter is attached to the PDA.

FIG. 15 shows a flowchart representing a configuration routine for another preferred embodiment of the present invention. Step 312 represents the PDA having an application button with a certain function wherein the PDA has a configuration program stored in a memory. Alternatively, the configuration program could reside on a remote site that is accessible by the PDA. At step 314, the PDA could poll its expansion connector to detect the presence of any attached devices. An attachable device (such as an adapter) may have associated with it an identification code. The identification code may include a portion that identifies a manufacturer and a portion that identifies a device. If the device is attached to the PDA, the PDA will check the identification code of the attached device at 316. Once the PDA determines the identification code of the attached device, at 318 the PDA accesses configuration data that provides information for the PDA to change the functionality of the application buttons. The configuration data may be determined by accessing a look up table (stored either locally on the PDA or remotely). Alternatively, instead of having an identification code associated with the attached device, the device may store the reconfiguration data in the device's nonvolatile memory. At 319, the configuration program may change the application button mapping in the PDA in order to change the functionality of one or more of the application buttons from an original function to a reconfigured function. Thus, the change of function of the buttons is seamless to the user. Again, the reconfigured function of the button will preferably be related to a function that was added by the attachment of the device to the PDA.

Figure 16:
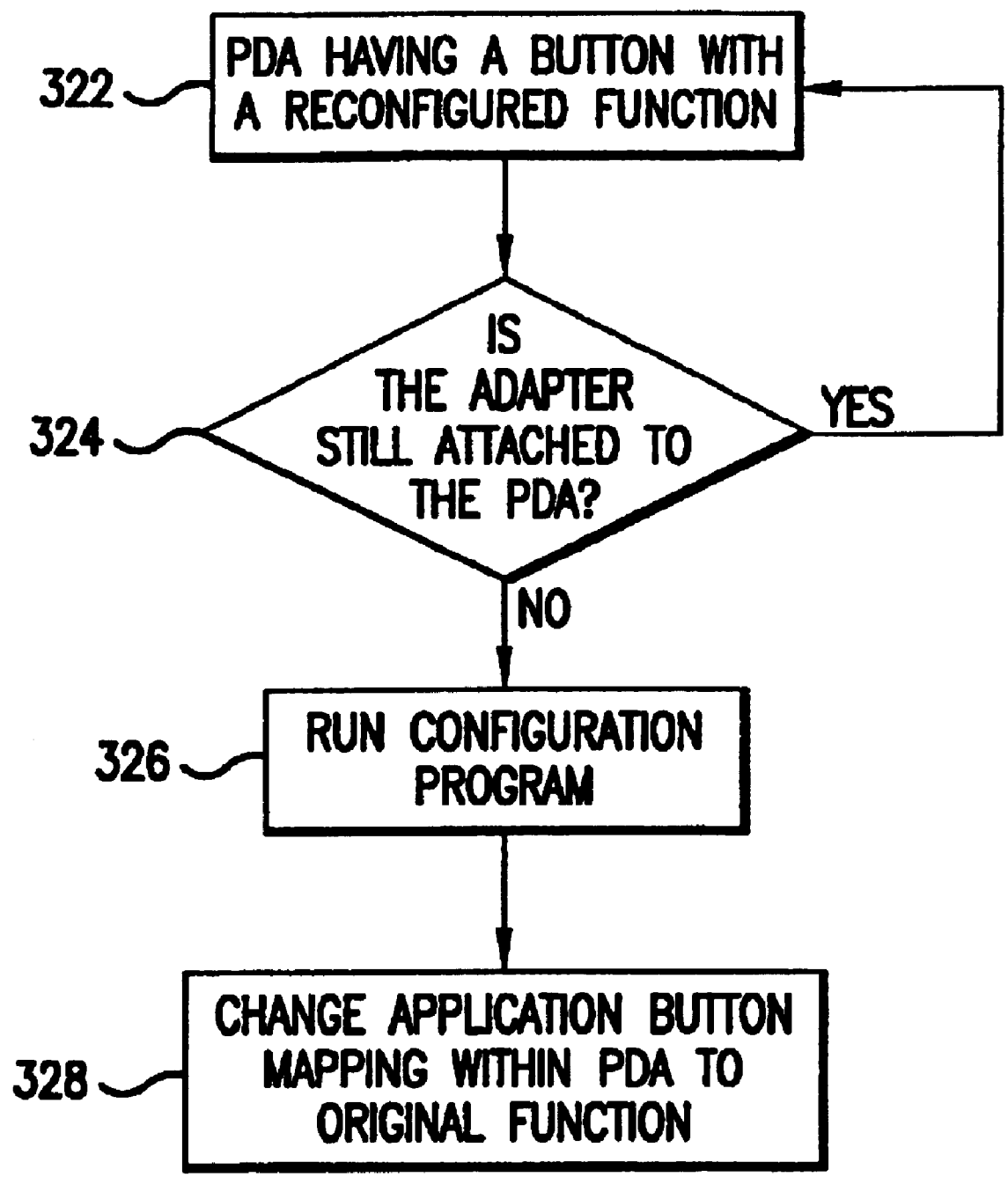
FIG. 16 shows a flowchart representing a configuration routine for a preferred embodiment wherein an adapter is removed from the PDA.

FIG. 16 shows a flowchart representing a configuration routine for a preferred embodiment wherein the adapter is removed from the PDA. Step 322 represents the PDA having an application button with a certain reconfigured function. In this preferred embodiment of the invention, the reconfigured function of the application button will revert back to the original function when the adapter is removed. The PDA may include a routine for polling the PDA's expansion connector to determine whether any devices are attached. At step 324 the PDA polls the expansion connector. If the polling routine determines that an adapter is no longer connected to the PDA, the configuration program may be activated at 326. At step 328 the configuration program may change the application button mapping in the PDA in order to change the functionality of the application buttons from the reconfigured function back to the original function. Thus, when a user no longer needs to use the additional functions provided by the adapter unit, he does not have to input any data into the PDA to revert back to the original function of the application buttons. The user can simply detach the adapter from the PDA, and the PDA could automatically reconfigure the application buttons.

Memory Feature

In another preferred embodiment of the invention, the adapter may include a memory backup system. The memory backup system helps prevent the PDA from losing information stored in the PDA's volatile memory in the event that the PDA's battery source is critically low.

PDA's typically include a battery monitoring circuit that monitors the PDA's battery source to determine an energy level. If the energy level falls below a certain shut down value, the PDA automatically shuts down. The manufacturer or programmer of the PDA sets the shut down value to be large enough so that some power is reserved to maintain the contents of the PDA's volatile memory. However, this system does not guarantee that the contents of the PDA's volatile memory will be preserved. The energy level may continue to decrease over time until the data stored in the volatile memory becomes irretrievable.

Figure 17:
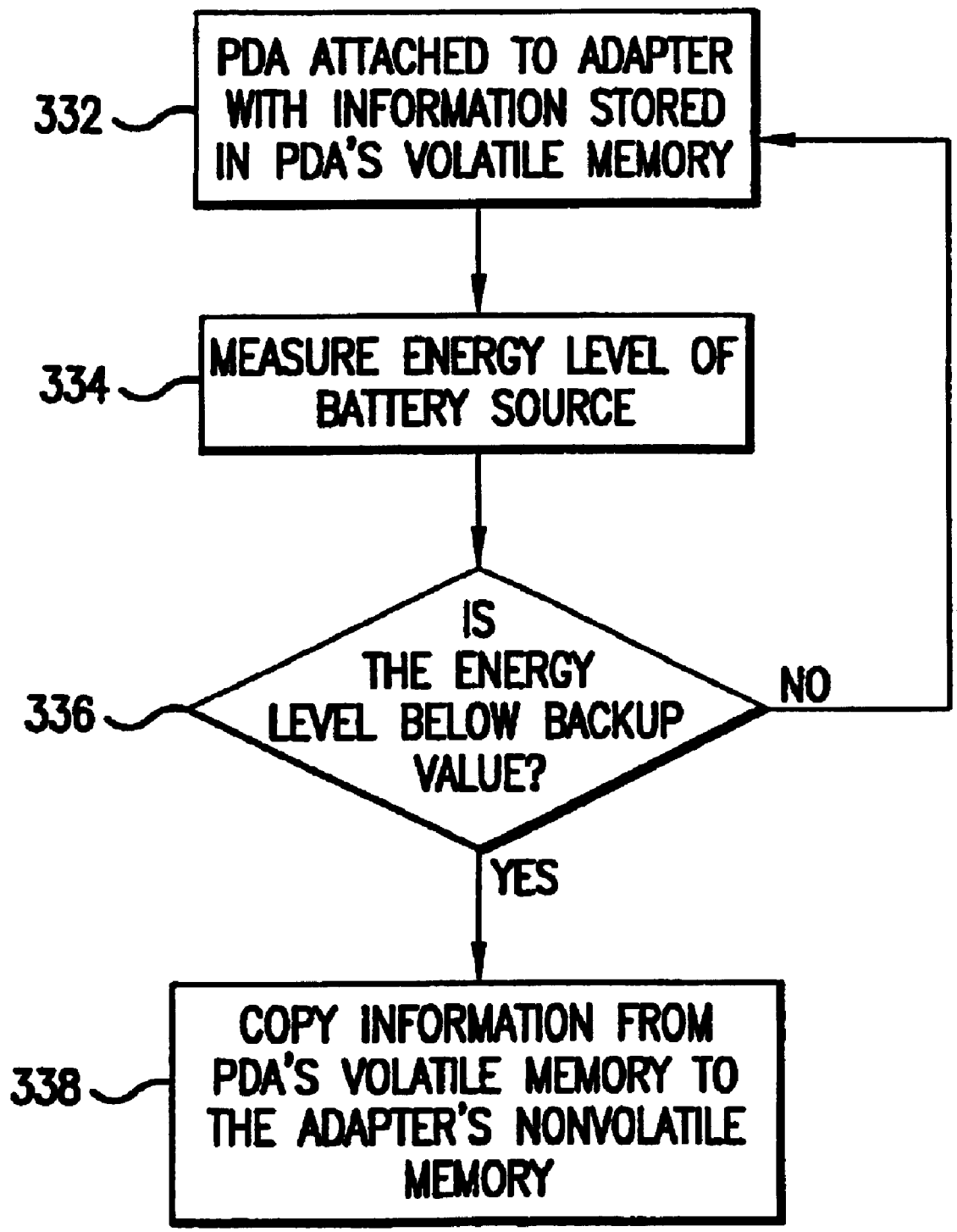
FIG. 17 shows a flowchart representing a memory backup system for a preferred embodiment of the present invention.

FIG. 17 shows a flowchart representing a memory backup system for a preferred embodiment of the present invention. Step 332 represents a PDA having a volatile memory attached to an adapter. The adapter has a nonvolatile memory capable of storing data and application programs. The system measures the energy level of the battery source at 334 and compares the energy level to a certain backup value at 336. If the energy level of the battery source falls below the backup value, at step 338 the data stored in the PDA's volatile memory is copied in the adapter's nonvolatile memory or to a remote storage area. The remote storage area may include a facility linked to a wide area network or a local area network. The backup value may be set to be equal to or different than the shut down value. If the data stored in the PDA's volatile memory is irretrievable because the energy level of the battery source is too low to maintain the memory, the data may be reconstructed by using the data stored in the adapter's nonvolatile memory.

Figure 18:
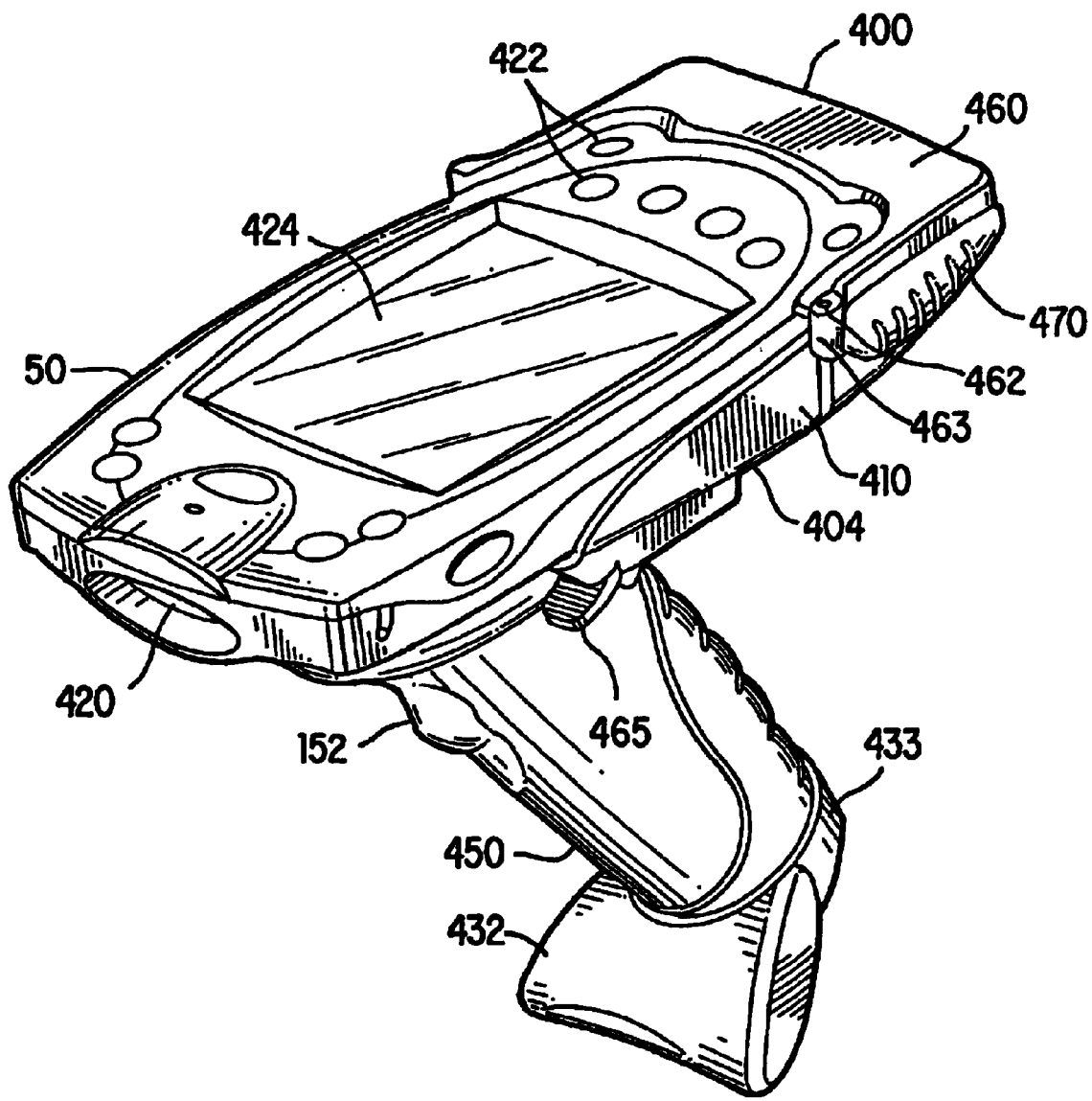
FIG. 18 shows a perspective view of adapter unit secured to a PDA in accordance with one embodiment of the present invention.
Figure 19:
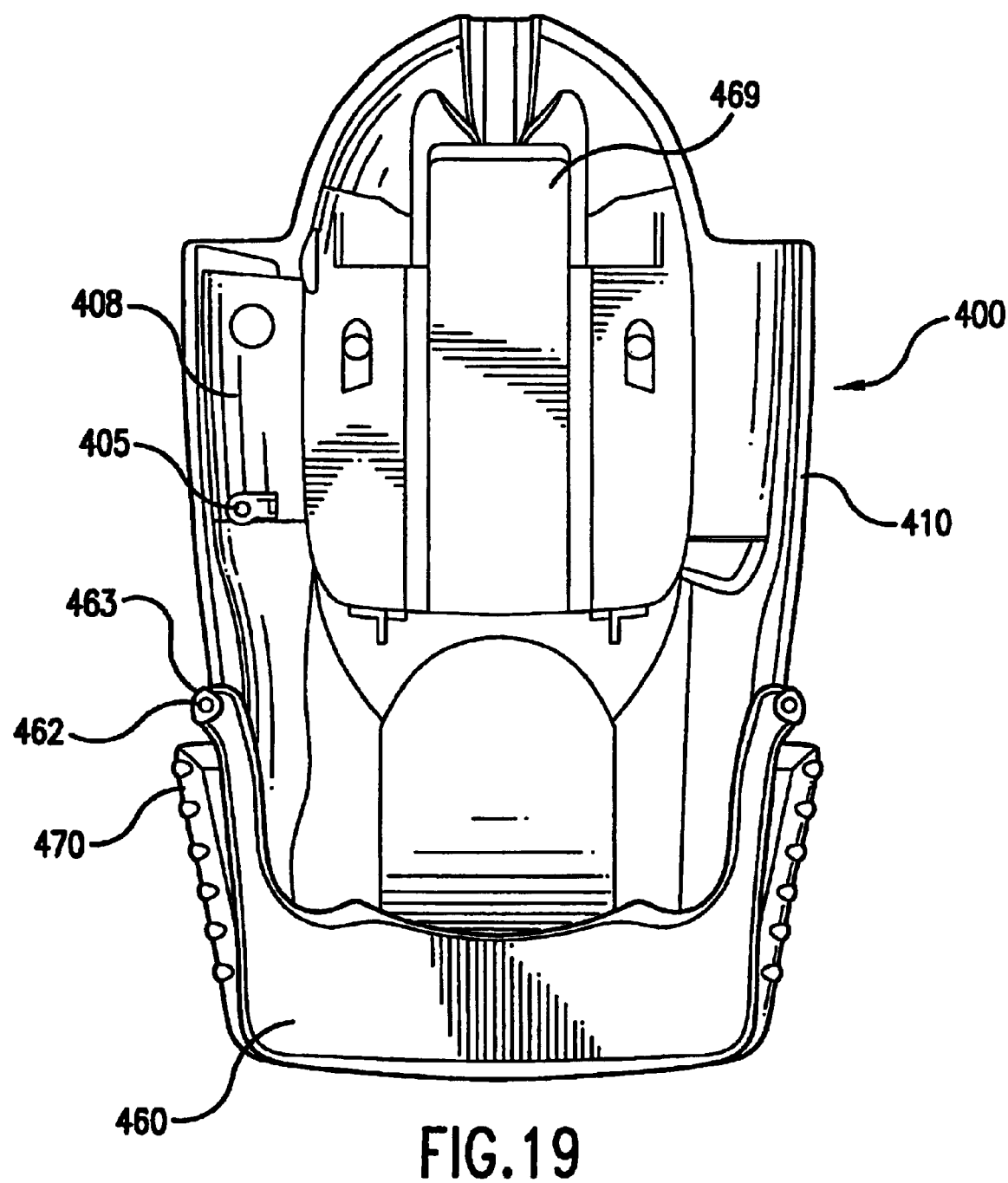
FIG. 19 shows a bottom view of the present invention shown in FIG. 18 with the PDA removed from the adapter.
Figure 20:
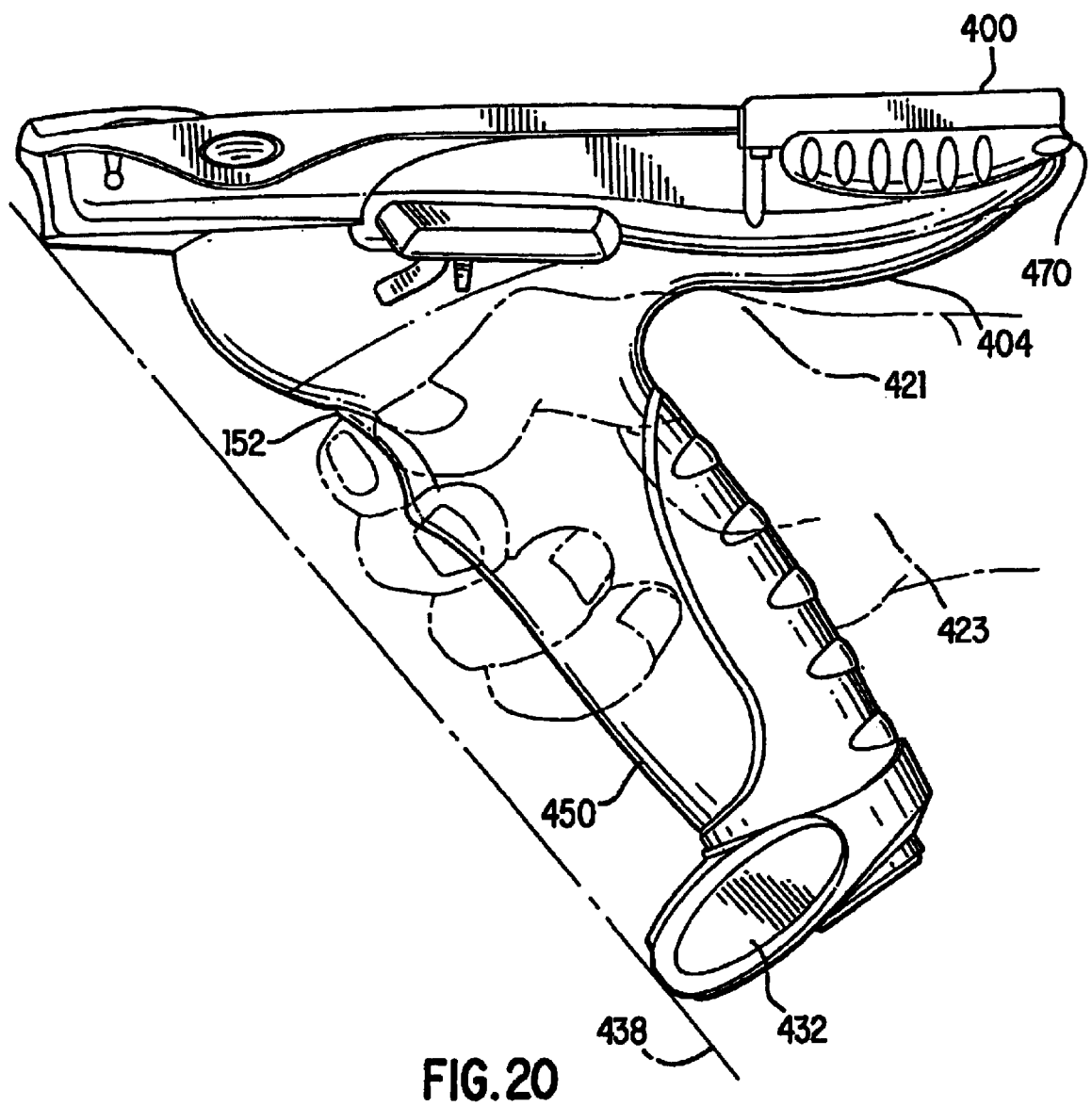
FIG. 20 shows a side view of the present invention shown in FIG. 18.

FIGS. 18–20 show an adapter unit 400 in accordance with one embodiment of the present invention. FIG. 18 shows a perspective view of adapter unit 400 having a PDA 50 secured to the adapter unit. The PDA is an SPT-1700 manufactured by the assignee of the present invention. The adapter unit may also be used with other types of PDAs. The adapter unit includes a handle grip 450 integrated into a body 404 of the adapter. Body 404 may be comprised of two or more sections that are secured together. Handle grip 450 includes a trigger mechanism 152 for triggering ("energizing") the module that is integrated inside the adapter. A scanning window 420 is provided at a first distal end of PDA 50. Within PDA 50 is a scanning module for scanning objects in a direction that is outward from the distal end. In an alternative embodiment, the scanning module may be within the adapter unit. Handle grip 450 extends from the end of the adapter unit near the distal end of the adapter. Handle grip 450 extents in a downward angular direction with respect the PDA, as will be further described.

The PDA includes the optical scanning module, a microcomputer for acquiring data and a power supply. Preferably, PDA includes a radio for sending data, such as inventory data, to a master station or to a nearby cash register, such as a checkout station or to another scanning device. The radio may comply with protocols for a wireless local area network (such as the Spectrum24® manufactured by the assignee of the present invention), a wireless wide area network, the Institute of Electrical and Electronic Engineers (IEEE) 802.11 standard of unlicensed spread spectrum communications and/or the IEEE Bluetooth standard. Alternatively, a cord providing power and data communications may be provided.

The upper surface of the PDA 50 includes a digital display 424 and keys 422. The display may be a touch sensitive data entry display. The display is rectangular in shape and has a vertical and horizontal configuration. The display may be switched between such configurations to adapt to a user's preference. In addition, the horizontal configuration can be further configured for left-hand or right-hand use so as to be adapted for a wider range of users.

The scanning module within the PDA is of a conventional type known in the art, for example, as described in the above referenced U.S. patents owned by the assignee of the present application. In a battery-operated configuration, handle grip 450 may include a connector at the lower end thereof, to be received in a cradle in which the battery of PDA 50 can be recharged. Alternatively, the adapter could be configured to provide for a direct link with a battery charger. When in a cradle, PDA 50 may be used for hands-free scanning. The cradle may also be equipped to provide read-out of acquired data through infrared communication ports or other forms of communication ports, as will be further described.

FIG. 19 shows a bottom view of adapter unit 400. The adapter unit includes a connecting interface 405 that assists in securing the PDA to the adapter unit. Connector interface 405 is flexibly secured to the adapter. Connector interface 405 may be secured by a leaf spring, retaining spring or similar arrangement to allow it to move in an orthogonal direction relative to a bottom wall 408 of the adapter. Extending from bottom wall 408 are two sidewalls 410. The connector interface 405 engages with a receiving receptacle on the bottom of the PDA (not shown). The bottom receiving receptacle may be any cavity within the PDA including a screw cavity. When the PDA is inserted into the adapter, connector interface 405 is forced down until the PDA's bottom receiving receptacle engages connector interface 405. At this moment connector interface 405 springs up into the PDA's bottom receiving receptacle. This may create an audible click. The audible click notifies the user that the adapter is fully secured to the PDA. To remove the PDA from the adapter, a securing latch 465 (shown, for example, in FIG. 18) coupled to connector interface 405 is engaged. Engaging securing latch 465 causes connector interface 405 to be flush or nearly flush with bottom wall 408. Thus, the PDA may be slid out of the adapter unit. The PDA and adapter combination may be designed so that the two components break away from each other in the event the combination is dropped or if a user forces the two apart (without engaging securing latch). The break away feature allows the components to separate with causing permanent damage to either component. The invention may further include a mechanism whereby a user may adjust the force required to separate the two components. In an alternative embodiment, the connector interface may comprise a screw that engages a threaded receiving receptacle on the PDA. The securing latch may comprise a knob that may be twisted to lock the PDA into the adapter.

Figure 21:
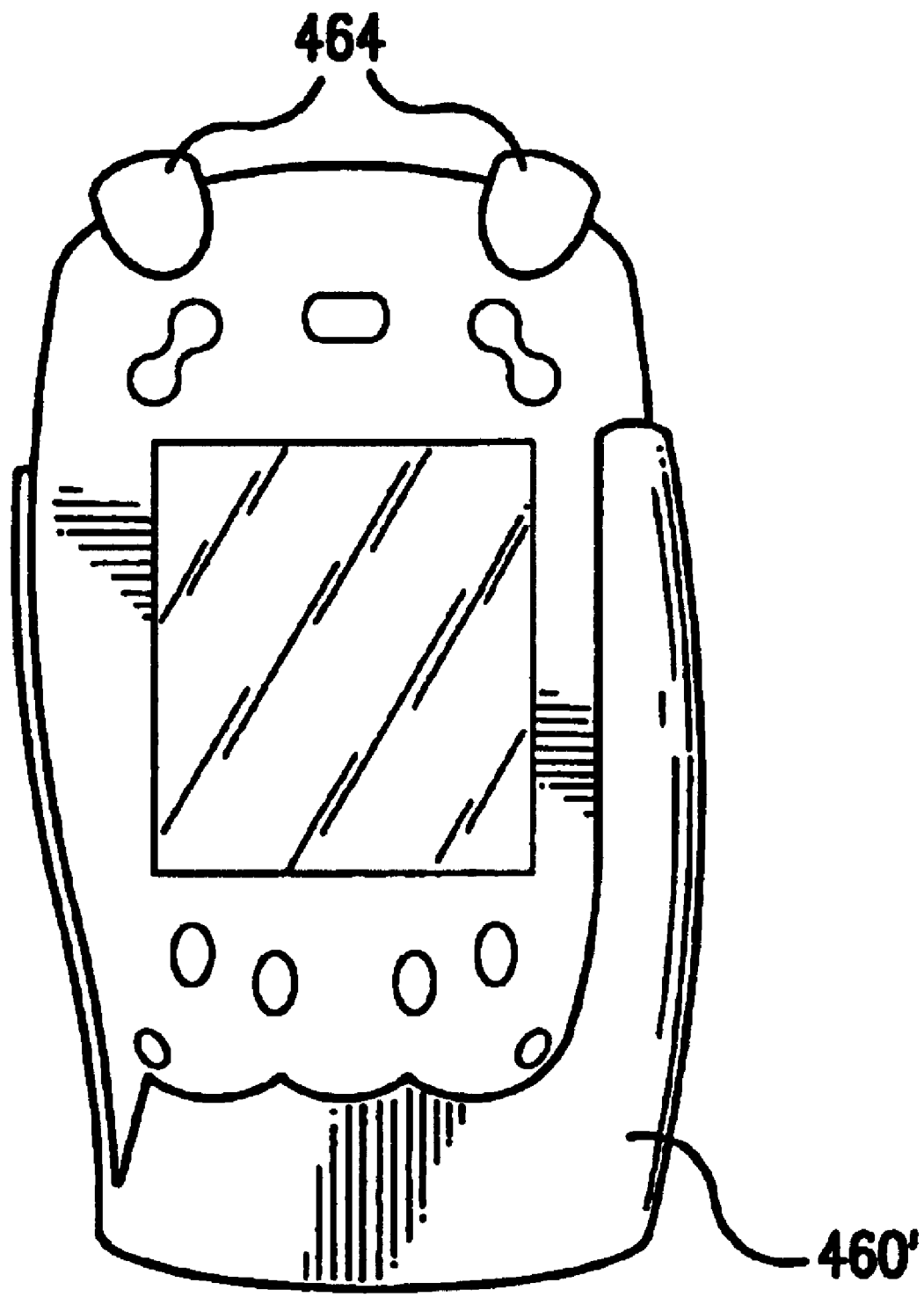
FIG. 21 shows a bottom view of another embodiment of the present invention with a PDA secured to the adapter.

A faceplate 460 is secured to one end of the adapter unit. Each side of faceplate 460 is secured using a screw 462 which engages a boss member 463. Faceplate 460 prevents the adapter from being pulled off the PDA and protects the PDA from front impact. Faceplate 460 is generally "U-shaped" having two sections along the sides of adapter. The faceplate can have numerous configurations. FIG. 21 shows a bottom view of another embodiment of the present invention with a PDA secured to the adapter unit. The adapter includes a faceplate 460' that has generally a reverse "L-shape." Faceplate 460' has only one side section. The side section may be located on the left or right side, and the configuration may be optimized for left-handed or right-handed users. In another embodiment, the faceplate may not have any sections along the sides of the adapter. The faceplate may extend over the PDA only along the bottom of the PDA.

The PDA may be further secured to the adapter via one or more retaining prongs. FIG. 21 shows retaining prongs 464 which go over the top portion of the face of the PDA. One end of retaining prongs 464 is secured to the adapter unit and the other end is pulled over the face of the PDA. Retaining prongs 464 may serve the dual purposes of securing the adapter to the PDA and protecting the adapter and PDA from impact. Retaining prongs 464 may be made of a somewhat flexible material so they can be stretched over the PDA. Alternatively, the retaining prongs may be secured to the adapter unit in a hinge arrangement and made with a more rigid material. The retaining prongs may be offered in different lengths to accommodate PDA's having different thicknesses.

Figure 22:
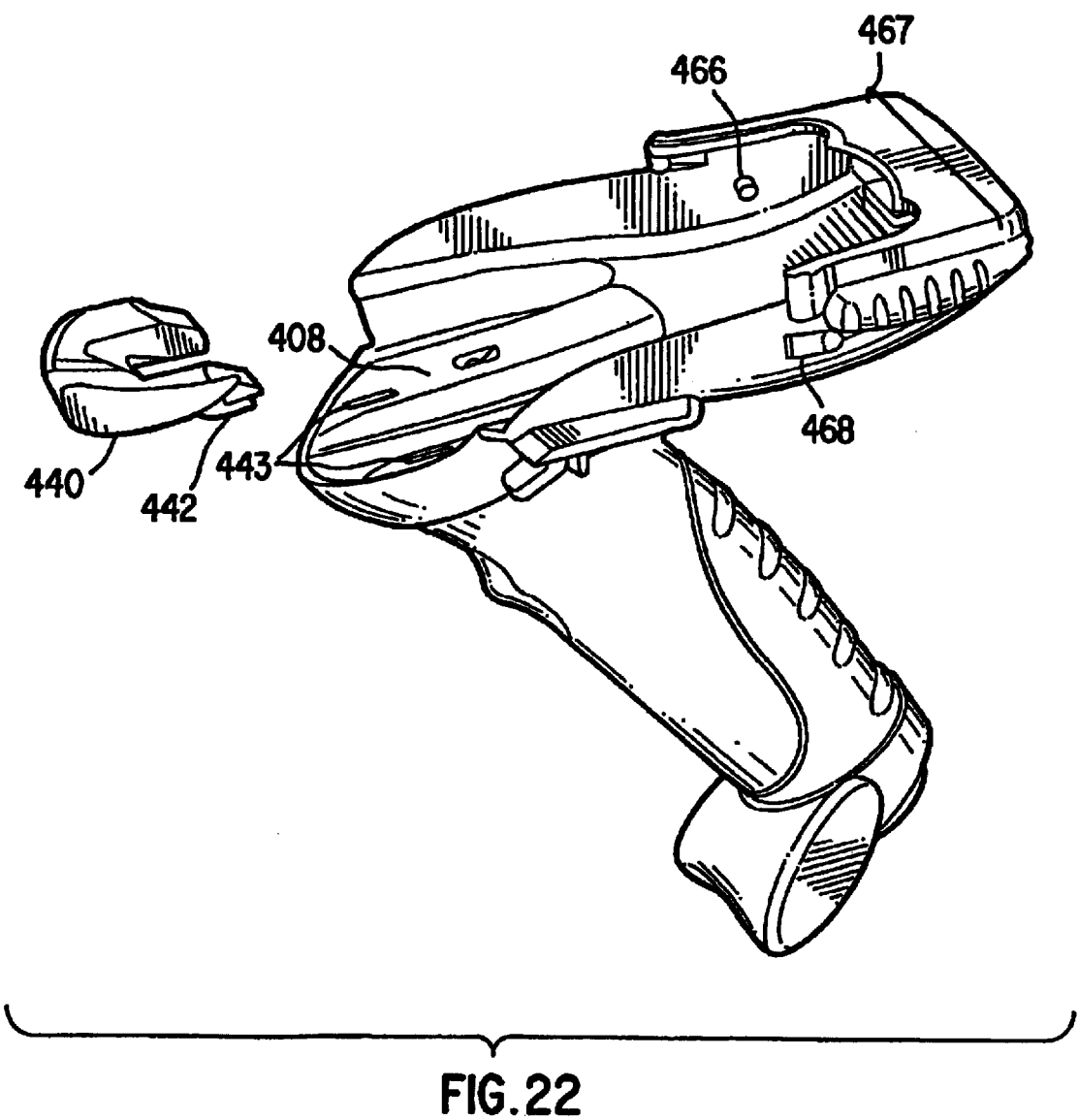
FIG. 22 shows a perspective view of another embodiment the present invention.

FIG. 22 shows an embodiment of the adapter unit that uses side interfaces to secure the adapter to the PDA. A side interface 466 is an element that engages a side edge of the PDA. On the opposing side of side interface 466 is another side interface (not shown). The adapter unit of FIG. 22 is designed for a PDA that has a side receiving receptacle on each side of the PDA (not shown) for engagement with each of the side interfaces. When the PDA is inserted into the adapter, side interface 466 engages the PDA's side receiving receptacle. To remove the PDA from the adapter, a securing latch 468 coupled to the side interface is engaged. Engaging securing latch 468 causes side interface 466 to be flush or nearly flush with the side wall of the adapter unit. Thus, the PDA may be slid out of the adapter unit. The side interface shown in FIG. 22 has a cylindrical shape. Other shapes may be employed without departing from the invention including rectangular or square. In an alternative embodiment, the side interface may comprise a screw that engages a threaded side receiving receptacle on the PDA. The securing latch may comprise a knob that may be twisted to lock the PDA into the adapter.

In a preferred embodiment, the adapter unit includes ruggedized bumpers to protect the adapter unit and PDA from impacts. FIGS. 18–20 show a bumper 470 that is secured to a proximal end of adapter 400. Bumper 470 is from about 1 mm to about 10 mm thick. Preferably, the bumper is thick enough to extend beyond any vulnerable portions of the adapter. As shown in FIG. 19, bumper 470 extends beyond boss member 463. Thus, if the adapter falls on its side, bumper 470 will hit the ground—not boss member 463. Bumper 470 may be made of rubber, plastic or similar ruggedized material.

As shown in FIG. 19, within the center of the adapter unit is a well 469. Well 469 is a recess within the adapter that can accommodate a hand strap or tether that may be attached to the back of the PDA. Thus, a PDA that has a hand strap or tether accessory can be secured to the adapter without removing the accessory.

One feature of the preferred embodiment shown in FIG. 20 is the arrangement of handle grip 450 near the distal end of the adapter. When adapter unit 400 is held in a user's hand 423 as shown in FIG. 20, the handle arrangement causes the proximal end of the adapter to extend over the radial surface 421 of the user's hand 423, such that the body 404 portion rests on and is supported by the radial hand surface 421. In this arrangement, the weight of the PDA and adapter unit is easily supported by the user during operation of the scanning device. When the user enters data by operating keys 422, body 404 is firmly supported by the radial hand surface 421 against the force of key strokes, avoiding a tendency to exert unsupported force on the handle grip of the user which would require a greater gripping force. Keys 422 and display 424 are arranged for easy access to the user and easy viewing when the scanning device is held in the hand.

As is known for such scanning devices, handle grip 450 includes trigger button 152 which may be a two-finger trigger and provide multiple functions, such as read only or read and store, and/or scroll menu utility. Handle grip 450 may have a battery compartment inside it, such that the PDA can be operated for longer periods of time. In a preferred embodiment, a shock absorbing material is placed between the electronic circuitry with the handle grip and the adapter cover. In the event the adapter unit is dropped or banged against a hard surface, the shock absorbing material acts to prevent damage to the electrical circuitry. As an alternative, the PDA may not have any batteries inside, and would receive its power from handle grip 450. Handle grip 450 also includes a wrist tether allowing the operator to carry the device without having to grip it.

In a preferred embodiment, the PDA is automatically configured to recognize the activation of trigger 152 as a scanning function. After the expansion connector of the PDA is mated with the adapter's adapter connector, signals can be sent between trigger 152 and circuitry within the PDA. The activation of trigger 152 sends an interrupt signal to the PDA. In order to minimize the number of interrupts, the system can share interrupts. For instance, the interrupt used to activate the trigger may be the same interrupt used to activate a hot sync operation. A hot sync is initiated upon activation of a button on the hot sync cradle that causes an interrupt signal to be sent to the PDA. In order to distinguish between a hot sync activation and a trigger activation, the adapter may have two of the pins in the adapter connector shorted. Upon receiving the interrupt, an interrupt handler checks to determine whether the PDA is in the adapter. This may be achieved by sending a signal on one of the two shorted pins and checking to see if the same signal is received on the other pin. If the signals are the same, the PDA is in the adapter. Since the pins are not shorted on the hot sync cradle, if the signals are different, the PDA must be in the hot sync cradle. If the PDA is in the adapter, the activation of the trigger will generate a start decode event, and on release of the trigger a stop decode event. The start decode event and stop decode event are signals sent to the scanning module to start and stop, respectively, the decoding process. If the PDA is in the hot sync cradle, the activation of the hot sync button will generate a hot sync operation. Other automatic configuration features may be employed in the present invention to allow the PDA to recognize other features provided by the adapter unit. For instance, the adapter unit may have a button that enables a user to speak into a microphone for wireless voice transmission. The button may be automatically configured to activate this function.

An additional feature of the preferred embodiment of the present invention is that the forward edge of the PDA forms a resting stand. The resting stand consists of the surfaces of the distal end of the PDA and the end of the handle grip 450. The place of a resting surface is shown by the dotted line 438 of FIG. 20. The surfaces may be configured either as a linear edge or as a multi-point stand. This enables the PDA and adapter combination to be conveniently rested against a flat horizontal surface in a stable position. The resting configuration may be further improved by providing a boot 432 on the lower end of handle grip 450, for providing a stable rest configuration. Boot 432 includes a boot ring 433 that goes around the circumference of the handle grip 450. Alternatively, boot 432 may be molded as part of handle grip 450. Boot 432 may also be part of a resilient gasket between portions of the handle. Boot 432 may be extended sideways, to provide greater stability as a stand and a resting ridge for handle grip 450. The resting configuration of the preferred embodiment enables a user to easily grasp the adapter when the PDA/adapter combination is resting against a surface.

Figure 23:
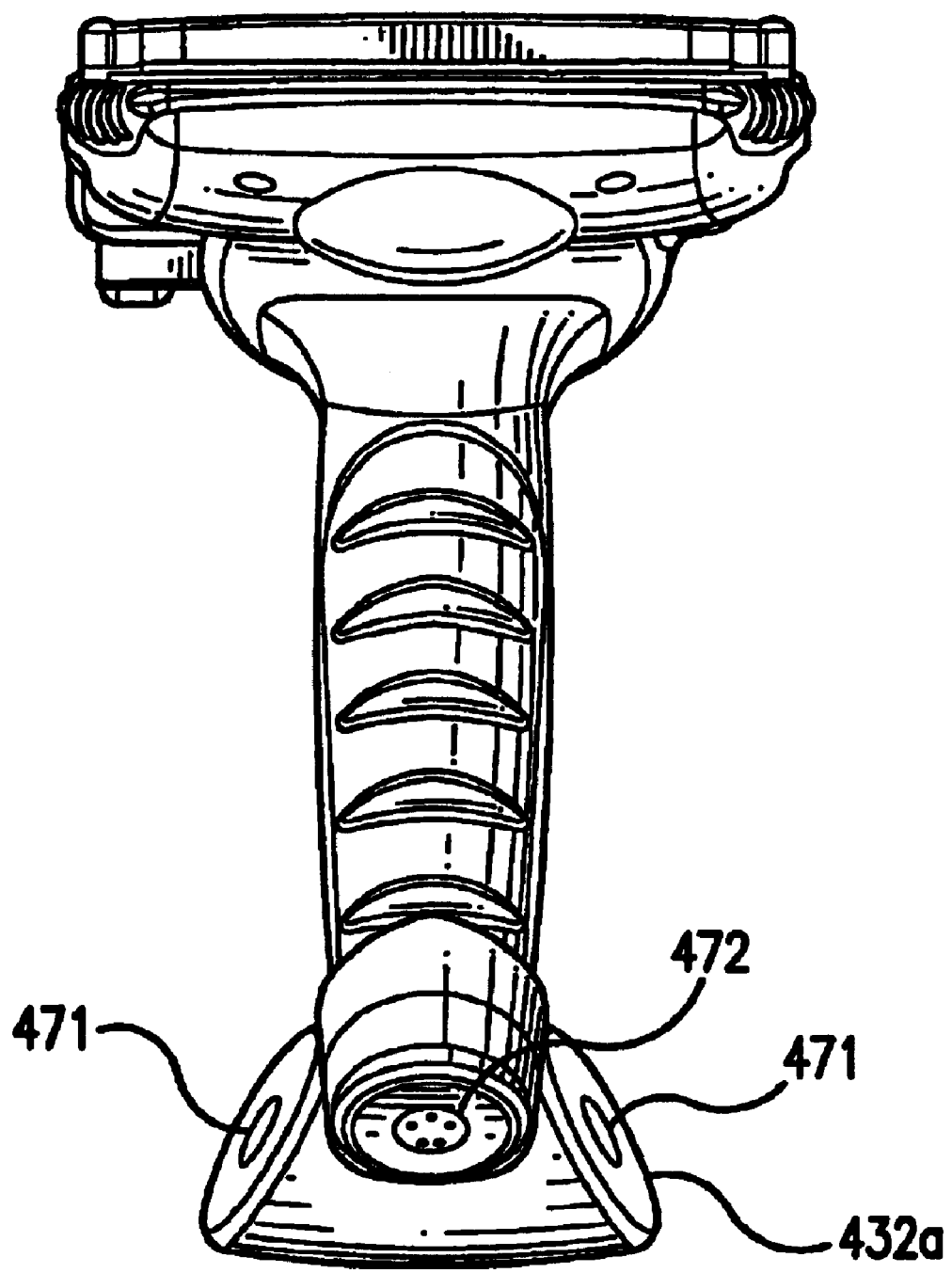
FIG. 23 shows a perspective view showing the bottom of the handle grip of another embodiment of the present invention.

FIG. 23 shows an adapter unit that includes a communications port 472 on the bottom of the handle. Communications port 472 may be a serial port or any communication configuration known to those of skill in the art. Communications port 472 enables communication between the adapter unit (or an attached PDA) and another device. The linked devices may be a printer, computer, charger, radio, cradle, power source etc. The adapter unit may include battery contacts that allow a battery within the adapter or PDA to be recharged. The adapter may also include elements that enable it to be removably secured to the linked devices. The embodiment of FIG. 23 shows an adapter that has a boot 432a that includes a pair of boot recesses 471. Boot recesses 471 can receive a gripping element (not shown) associated with the linked device. For instance, a vehicle cradle may include a housing having a gripping element for engaging boot recesses 471. When a driver returns to his vehicle he can secure the adapter unit to the vehicle cradle. The adapter unit can communicate with the vehicle cradle via communications port 472. The vehicle cradle may be able to supply power to the adapter unit, download information from the adapter unit or upload information from the adapter unit. The vehicle cradle may have a wireless radio capable of transmitting information downloaded from the adapter unit.

The adapter unit may include a short range wireless radio to communicate with other devices. One example of such a radio is an infrared radio (although other radios known to those of skill in the art may be employed). The adapter unit may then communicate with a device that has an infrared receiver. For instance, if a printer has an infrared receiver, the adapter unit can send information wirelessly to the printer.

The embodiment of the present invention shown in FIG. 22 includes a filler block 440. Filler block 440 includes one or more securing teeth 442. The bottom wall of the adapter includes securing receptacles 443. Securing teeth 442 engage with securing receptacles 443 to form an integrated adapter unit. Filler block 440 allows the adapter to accommodate PDA's of various thicknesses. In the event of a narrow PDA, filler block 440 may be employed. Without filler block 440 there would be a visible gap between the PDA and the adapter. In the event of a thick PDA, filler block 440 may be removed from the adapter. The features of the PDA may dictate its thickness. For instance, a PDA having a radio card may be thicker than a PDA without the card. The thickness of the PDA may also depend upon the manufacturer of the PDA. Filler blocks of various thicknesses may be provided to allow a continuous spectrum of PDA thicknesses.

The adapter unit of FIG. 22 also includes a magnetic strip reader 467. Magnetic strip reader 467 enables a user to use the PDA as a card reader. After swiping a card through magnetic strip reader 467 the PDA can display information included on the swiped card. Various locations could be chosen for magnetic strip reader 467. It may be located on the side of the adapter unit or on a portion that goes over the face of the PDA.

The adapter unit of the present invention is capable of providing other enhanced or additional features to a PDA. For instance, for some applications it would be desirable to provide an enhanced keyboard, a radio frequency identification reader (RFID), a printer, an enhanced microphone or an enhanced speaker. The term "enhanced" means that a PDA may have a particular feature but the feature may be improved. For example, the limited number of keys on a PDA is sufficient for many applications, but for some applications it is desired to have a QWERTY keyboard. Also, a PDA may have a speaker, but in some industrial applications it is desired to have a loader speaker. The enhanced or additional features can be incorporated within the housing of the adapter unit. Alternatively, the enhanced or additional features can be within modular elements that are linked to the adapter unit. The adapter unit may be configured to receive a keyboard module, a magnetic strip reader module, a RFID module, a printer module, a microphone module or a speaker module. When a user needs a particular feature, the user can simply attach the module that has the feature. Afterward, the user can simply remove the module.

The adapter unit can be secured to a user via a fastening accessory. Fastening accessories include a belt clip, a holster or a loop. The belt clip is a clip that is secured to the adapter unit and can be secured to the belt of a user. The holster (like a holster for a gun) can be secured to a user's belt, pants, solder or ankle, and is configured to receive and secure the adapter unit. The loop comprises a loop or ring that can be secured to a user, and is configured to receive the adapter's handle grip. Another accessory that may be offered for the present invention is a weather guard to protect the PDA from the elements. The weather guard covers vulnerable portions of the PDA that are exposed after the PDA is secured to the adapter unit. In a preferred embodiment, the weather guard is shaped along the contours of the adapter unit so when the weather guard is secured to the adapter unit/PDA combination, there are minimal exposed surfaces of the PDA. Preferably, the weather guard is made of a plastic material and includes a clear portion that allows a user to view the PDA's display even when the weather guard is in place.

What is claimed is:

1. An adapter unit for removably receiving a personal digital assistant, the personal digital assistant having a back surface, two side surfaces defining a width of the personal digital assistant, a top surface and a bottom surface defining a length of the personal digital assistant and a scanning window for reading a product identification code in a direction which is outward from the top surface, said adapter unit comprising:

a body portion having a bottom wall and two sidewalls, said bottom wall having a top section and a bottom section, said top section of said bottom wall being configured to conform to the back surface of the personal digital assistant and said two side walls configured to prevent side to side movement of the personal digital assistant; and a handle grip extending from said bottom section of said bottom wall, said handle portion being joined to said body portion at a selected angle with respect to said body portion to cause a proximal end of said bottom section of said bottom wall to rest on a radial surface of a user's hand when the user grasps the handle portion.

2. The adapter unit of claim 1 wherein said adapter unit includes a filler block secured between the back surface of the personal digital assistant and the bottom wall.

3. The adapter unit of claim 1 further comprising a flexibly secured connector interface for engaging the personal digital assistant.

4. The adapter unit of claim 1 further comprising a faceplate for covering a top portion of said personal digital assistant.

5. The adapter unit of claim 1 further comprising retaining prongs for covering a top portion of said personal digital assistant.

6. The adapter unit of claim 1 wherein said handle grip further comprises a trigger.

7. The adapter unit of claim 1, further comprising a bumper for protecting the body portion.

8. The adapter unit of claim 3 wherein said connector interface engages the back surface of the personal digital assistant.

9. The adapter unit of claim 3 wherein said connector interface engages at least one of the side surfaces of the personal digital assistant.

10. An adapter unit capable of being removeably secured to a personal digital assistant, said personal digital assistant having a module for reading a product identification code and an expansion connector, said adapter unit comprising:
- a body portion configured to receive the personal digital assistant, said body portion having two side walls to prevent side to side movement of the personal digital assistant;
- an adapter connector for creating a communications link with said expansion connector of the personal digital assistant; and
- a handle that extends from a bottom section of said body, the handle being joined at a selected angle with respect to the body to cause a proximal end of the bottom section of said body to rest on a radial surface of a user's hand when the user grasps the handle, the handle having a trigger coupled to the personal digital assistant through said communications link.

11. The adapter unit of claim 10 wherein a filler block is secured to said adapter unit.

12. The adapter unit of claim 10 further comprising a flexibly secured connector interface for engaging the personal digital assistant.

13. The adapter unit of claim 10 further comprising a faceplate for covering a top portion of said personal digital assistant.

14. The adapter unit of claim 10 further comprising retaining prongs for covering a top portion of said personal digital assistant.

15. The adapter unit of claim 10 wherein said handle grip further comprises a trigger.

16. The adapter unit of claim 10, further comprising a bumper for protecting the body portion.

17. The adapter unit of claim 12 wherein said connector interface engages aback surface of the personal digital assistant.

18. The adapter unit of claim 12 wherein said connector interface engages a side surfaces of the personal digital assistant.

19. A communications system comprising:
- a personal digital assistant having a display that provides a screen in a vertical configuration and a horizontal configuration;
- an adapter unit configured to be removeably secured to the personal digital assistant; said adapter unit having a handle grip graspable by a user's left hand or a user's right hand; and
- an orientation agent for orienting the horizontal configuration of the display between a first and second position, said first position optimizing the horizontal configuration for the user's left hand and said second position optimizing the horizontal configuration for the user's right hand.

* * * * *